US012001024B2

(12) United States Patent
Wang et al.

(10) Patent No.: US 12,001,024 B2
(45) Date of Patent: Jun. 4, 2024

(54) ENERGY-EFFICIENT ADAPTIVE 3D SENSING

(71) Applicant: Snap Inc., Santa Monica, CA (US)

(72) Inventors: Jian Wang, West New York, NJ (US); Sizhuo Ma, Long Island City, NY (US); Brevin Tilmon, New York City, NY (US); Yicheng Wu, Houston, TX (US); Gurunandan Krishnan Gorumkonda, Kirkland, WA (US); Ramzi Zahreddine, Denver, CO (US); Georgios Evangelidis, Vienna (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/299,923

(22) Filed: Apr. 13, 2023

(65) Prior Publication Data

US 2024/0126084 A1   Apr. 18, 2024

(30) Foreign Application Priority Data

Oct. 12, 2022   (GR) .............................. 20220100840

(51) Int. Cl.
| | | |
|---|---|---|
| *G02B 27/01* | (2006.01) | |
| *G06F 3/01* | (2006.01) | |
| *G06T 19/00* | (2011.01) | |

(52) U.S. Cl.
CPC ......... *G02B 27/0172* (2013.01); *G06F 3/013* (2013.01); *G06T 19/006* (2013.01); *G02B 2027/0138* (2013.01)

(58) Field of Classification Search
CPC ........ G02B 27/0172; G02B 2027/0138; G06F 3/013; G06T 19/00; G06T 19/006;
(Continued)

(56) References Cited

U.S. PATENT DOCUMENTS 10,210,618 B1 *   2/2019   Kuffner .................... G06T 7/11
10,896,516 B1 *   1/2021   Kantor ..................... G06T 7/74
(Continued)

FOREIGN PATENT DOCUMENTS

WO   2019173556   9/2019

OTHER PUBLICATIONS

"International Application Serial No. PCT/US2023/034564, International Search Report dated Jan. 30, 2024", 4 pgs.
(Continued)

*Primary Examiner* — Tom V Sheng
(74) *Attorney, Agent, or Firm* — Schwegman Lundberg & Woessner, P.A.

(57) ABSTRACT

An energy-efficient adaptive 3D sensing system. The adaptive 3D sensing system includes one or more cameras and one or more projectors. The adaptive 3D sensing system captures images of a real-world scene using the one or more cameras and computes depth estimates and depth estimate confidence values for pixels of the images. The adaptive 3D sensing system computes an attention mask based on the one or more depth estimate confidence values and commands the one or more projectors to send a distributed laser beam into one or more areas of the real-world scene based on the attention mask. The adaptive 3D sensing system captures 3D sensing image data of the one or more areas of the real-world scene and generates 3D sensing data for the real-world scene based on the 3D sensing image data.

20 Claims, 15 Drawing Sheets

(58) Field of Classification Search
CPC .......... G06T 19/20; G06T 2207/10028; G06T 17/00; G06V 20/20; G06V 20/64
USPC ........................................................... 345/8
See application file for complete search history.

(56) References Cited

U.S. PATENT DOCUMENTS

| | | | |
|---|---|---|---|
| 11,218,660 B1* | 1/2022 | Liu | ................ H04N 25/772 |
| 2010/0020074 A1* | 1/2010 | Taborowski | ........ G01C 21/3837 |
| | | | 345/420 |
| 2012/0092328 A1 | 4/2012 | Flaks et al. | |
| 2019/0355138 A1 | 11/2019 | Hall et al. | |
| 2020/0074651 A1* | 3/2020 | Zhang | ................ G02B 27/0179 |
| 2020/0075652 A1* | 3/2020 | Chen | ................ H01L 27/14645 |
| 2020/0184726 A1* | 6/2020 | Jo | ................ G02B 27/0172 |
| 2020/0186731 A1* | 6/2020 | Chen | ................ H04N 25/778 |
| 2020/0388053 A1* | 12/2020 | Wallack | ................ H04N 13/282 |
| 2021/0125405 A1* | 4/2021 | Tran | ................ G06T 19/006 |
| 2022/0030183 A1* | 1/2022 | Chhabria | ................ H04N 23/11 |
| 2022/0050290 A1 | 2/2022 | Fortin-deschênes et al. | |
| 2023/0092325 A1* | 3/2023 | Tsai | ................ H04N 25/75 |
| | | | 348/308 |
| 2023/0092766 A1* | 3/2023 | Vodrahalli | ............ G16H 50/50 |
| | | | 382/128 |

OTHER PUBLICATIONS

"International Application Serial No. PCT/US2023/034564, Written Opinion dated Jan. 30, 2024", 7 pgs.

\* cited by examiner

ENERGY-EFFICIENT ADAPTIVE 3D SENSING

CLAIM OF PRIORITY

This application claims the benefit of priority to Greece Patent Application Serial No. 20220100840, filed on Oct. 12, 2022, which is incorporated herein by reference in its entirety.

TECHNICAL FIELD

The present disclosure relates generally to user interfaces and more particularly to user interfaces used in augmented and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays that occlude the user's eyes. As used herein, the term eXtended Reality (XR) refers to augmented reality, virtual reality and any hybrids of these technologies unless the context indicates otherwise.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
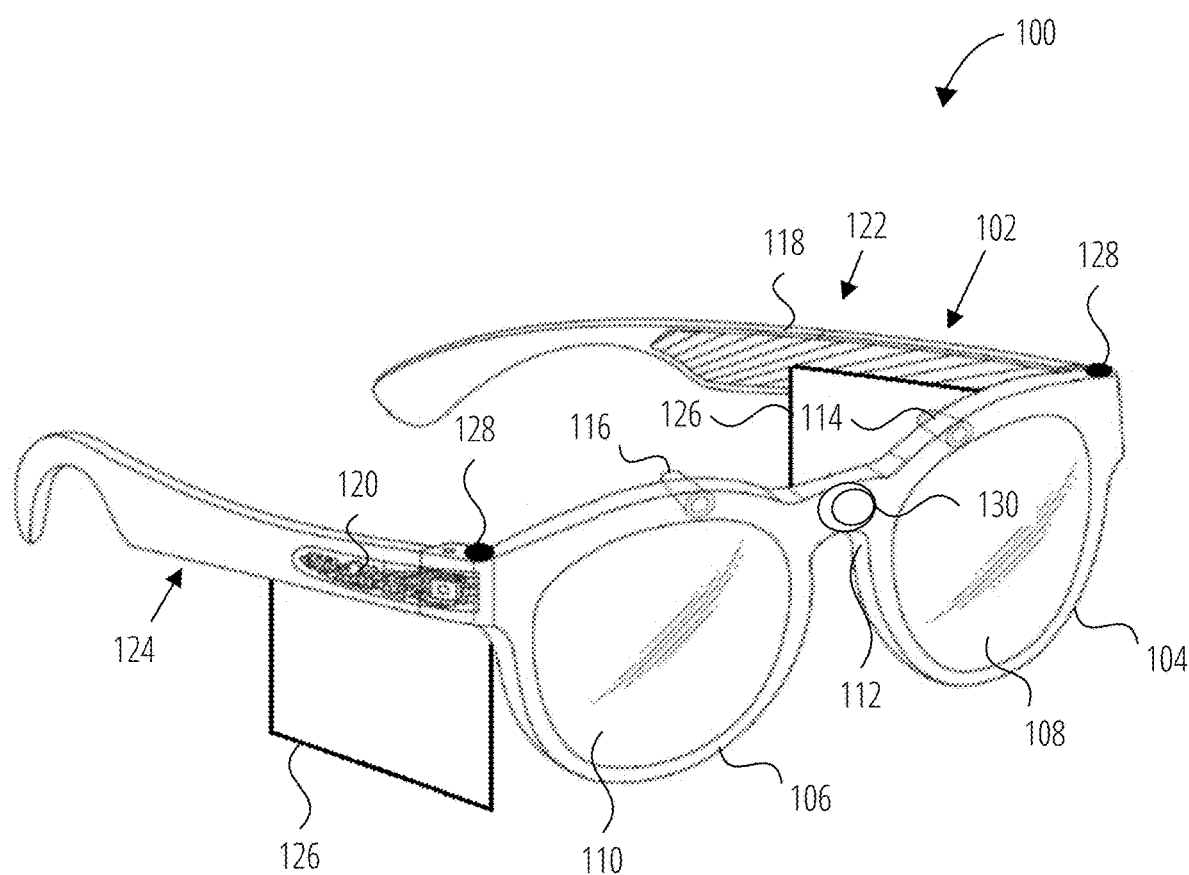
FIG. 1 is a perspective view of a head-worn device, in accordance with some examples.

Users of mobile devices, such as smartphones and XR glasses, use their mobile devices for a multitude of uses where accurate three-dimensional (3D) sensing of a real-world scene is desirable. Example uses include XR applications where a 3D model of the real-world scene is used for placement of virtual objects in an XR experience provided to a user, such as digital avatars and the like, and providing hand-tracking services for a user interface of the XR application. Because of the physical constraints of mobile devices, the capacity of total energy by the battery is very limited. What's more, wearables have strict requirement on heat, and energy-efficient devices usually generate much less heat. Therefore, energy-efficient 3D sensing methodologies are desirable.

Some 3D sensing methodologies use a large amount of energy to drive light projectors to illuminate an entire real-world scene object, power cameras to collect the image data, and provide computing resources for computer vision processing of the image data captured by the cameras. In full pattern 3D sensing systems, an entire real-world scene is illuminated using a light source that consumes a large amount of energy. In addition, as the entire real-world scene is illuminated, image data collected for the entire real-world scene is processed at a high resolution which requires additional energy through the use of computing resources. In line scanning 3D methodologies, a laser is used to sequentially scan an entire real world-scene and a rolling shutter camera is used to capture image data. While providing an improvement in operating distance, the methodology still scans an entire real-world scene and therefore uses a comparable amount of energy as full pattern methodologies. Point scanning 3D sensing methodologies use a single point laser light source to scan an entire real-world scene. While providing improved distance over full pattern 3D sensing, systems using point scanning methodologies are slow and still require a large amount of energy as they point scan an entire real-world scene. In addition, eye safety is a concern in full field-of-view point scanning and line scanning, because the laser energy is concentrated not only spatially but also temporally.

In some examples of the present disclosure, an adaptive 3D sensing system simultaneously captures images using one or more cameras of an area of a 3D real-world scene. The adaptive 3D sensing system computes depth estimates and confidence values for each pixel of the image. The adaptive 3D sensing system computes an attention mask for regions of the image that meet one or more conditions, such as but not limited to: (1) depth confidence is below a specified threshold for pixels in the region; (2) virtual objects of an XR user interface are to be rendered in the area of the real-world scene that corresponds to the region; and/or (3) an area of the real-world scene corresponds to the region of the image that has not been mapped into a 3D model of the real-world scene. The attention mask includes masking data used to send a distributed laser beam into the areas of the real-world scene corresponding to the regions of the image that meet the one or more conditions. The adaptive 3D sensing system commands one or more projectors to project or send a distributed laser beam into areas of a real-world scene based on the attention mask.

In some examples, the adaptive 3D sensing system uses less energy than a system that scans an entire real-world scene by sending a distributed laser beam into specified areas of a real-world scene and capturing 3D data for those areas and not in other areas of the real-world scene.

In some examples, energy reductions are realized by calculating a partial depth of a real-world scene.

In some examples, the adaptive 3D sensing system increases eye-safety because the distributed laser beam may be of lower power and thus may stay at a location for a longer time than in a full field-of-view scanning system (such as a line-scanning system) resulting in the laser energy being spread out temporally. For example, a line-scanning system may scan 100~1000 lines per frame, given the same frame rate, a distributed laser beam in an adaptive 3D sensing system may stay at a location 100~1000 times longer than the line-scanning system's distributed laser beam (which is a line). The maximum permissible exposure (MPE) is the maximum allowable laser energy which does no harm to the human eye. MPE is larger as an exposure duration becomes longer. For the same amount of energy, a system with longer duration is safer.

In some examples, a projector comprises a Diffractive Optical Element (DOE), a laser, and a moveable Microelectromechanical System (MEMS) mirror. The MEMS mirror is operable to deflect a laser beam through the DOE with a small dispersive angle and send a distributed laser beam onto one or more specified areas of the real-world scene selected for 3D sensing based on an attention mask. In some examples, during a depth frame's exposure, the MEMS mirror does not rotate and deflects a laser pattern to one location deemed to be of interest. In some examples, during a depth frame's exposure, the MEMS mirror rotates to deflect a laser pattern to several locations while capturing the depth frame; here in some examples, the camera captures several frames, each of which correspond to a pattern location, thereby increasing a signal-to-noise ratio as compared to capturing one frame when ambient lighting noise is elevated.

In some examples, a phase Spatial Light Modulator (SLM) is used to send a distributed laser beam of a laser onto one or more specified areas of the real-world scene selected for 3D sensing based on an attention mask.

In some examples, one or more cameras are used to capture image data comprising valid 3D image sensing data in the illuminated area.

In some examples, one or more depth sensors are used to capture the 3D data comprising 3D depth sensor data.

Other technical features may be readily apparent to one skilled in the art from the following figures, descriptions, and claims.

FIG. 1 is a perspective view of a head-worn XR system (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing system, such as a computer 120, which can be of any suitable type so as to be carried by the frame 102 and, in one or more examples, of a suitable size and shape, so as to be partially disposed in one of the temple piece 122 or the temple piece 124. The computer 120 can include multiple processors, memory, and various communication components sharing a common power source. As discussed below, various components of the computer 120 may comprise low-power circuitry, high-speed circuitry, and a display processor. Various other examples may include these elements in different configurations or integrated together in different ways. Additional details of aspects of the computer 120 may be implemented as illustrated by the data processor 1002 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene environment scene.

The glasses 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

In some examples, the glasses 100 have a projector 130 mounted in a forward-facing location on the frame 102 of the glasses 100. The projector may be used by an adaptive 3D sensing system of the glasses 100 to project a focused beam of light enabling the adaptive 3D sensing system to perform adaptive 3D sensing.

Figure 2:
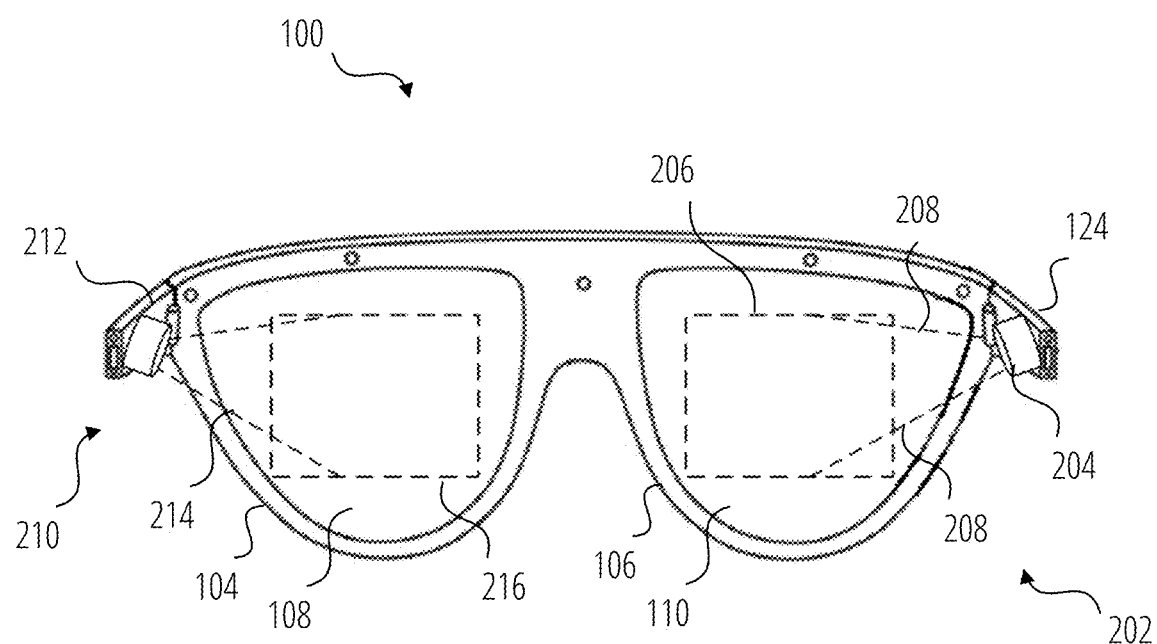
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene environment seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene environment seen by the user. The combination of a GPU, the forward optical assembly 202, the left optical element 108, and the right optical element 110 provide an optical engine of the glasses 100. The glasses 100 use the optical engine to generate an overlay of the real-world scene environment view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 can be presented with information, content and various user interfaces on the near eye displays. As described in more detail herein, the user can then interact with the glasses 100 using a touchpad 126 and/or the buttons 128, voice inputs or touch inputs on an associated device (e.g. mobile computing system 1026 illustrated in FIG. 10), and/or hand movements, locations, and positions detected by the glasses 100.

In some examples, the glasses 100 comprise a stand-alone AR system that provides an AR experience to a user of the glasses 100. In some examples, the glasses 100 are a component of an AR system that includes one or more other devices providing additional computational resources and or additional user input and output resources. The other devices may comprise a smartphone, a general purpose computer, or the like.

Figure 3:
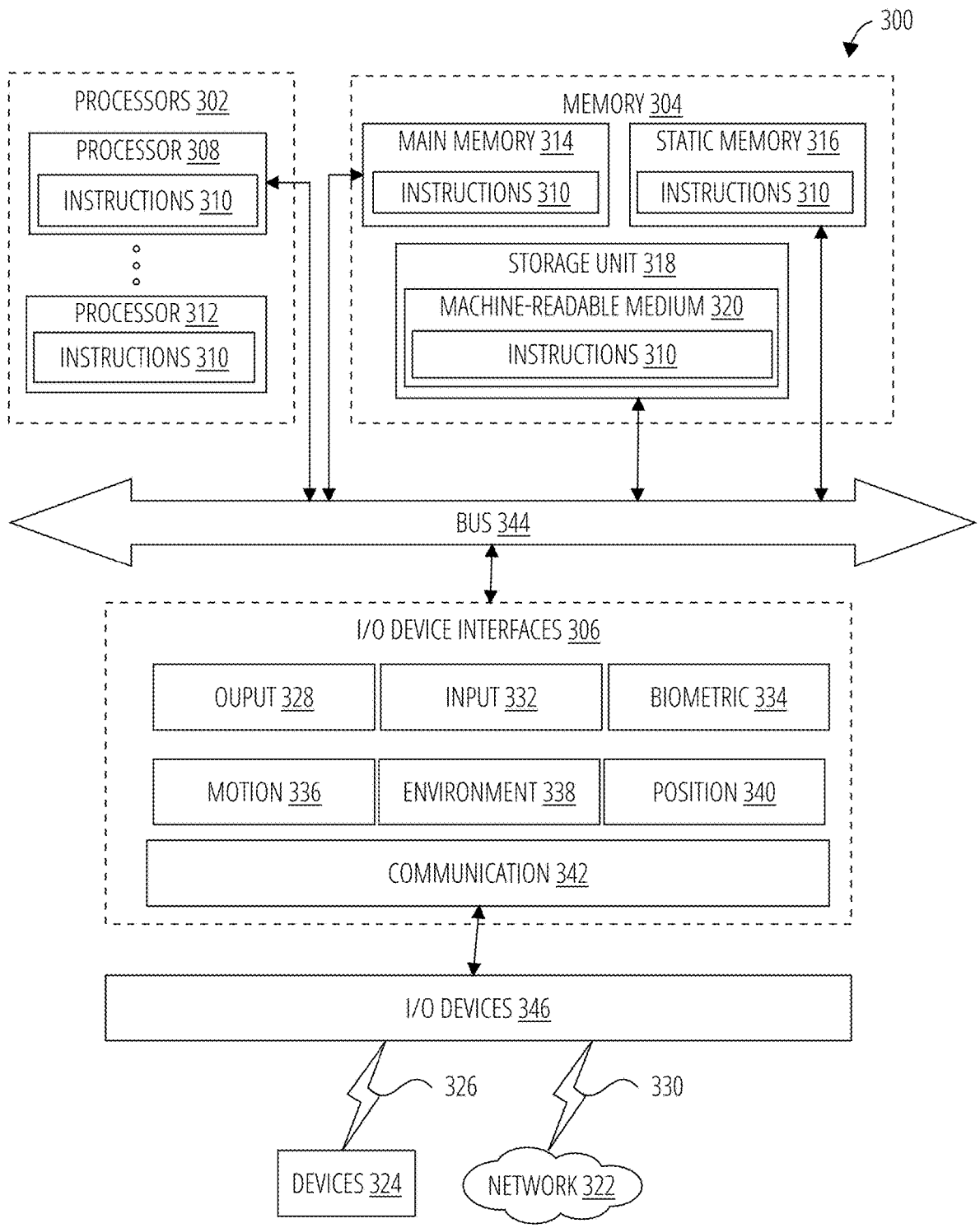
FIG. 3 is a diagrammatic representation of a machine within which a set of instructions may be executed for causing the machine to perform any one or more of the methodologies discussed herein in accordance with some examples.

FIG. 3 is a diagrammatic representation of a machine 300 within which instructions 310 (e.g., software, a program, an application, an applet, an app, or other executable code) for causing the machine 300 to perform any one or more of the methodologies discussed herein may be executed. The machine 300 may be utilized as a computer 120 of an AR system such as glasses 100 of FIG. 1. For example, the instructions 310 may cause the machine 300 to execute any one or more of the methods described herein. The instructions 310 transform the general, non-programmed machine 300 into a particular machine 300 programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 in conjunction with other components of the AR system may function as, but not limited to, a server, a client, computer, a personal computer (PC), a tablet computer, a laptop computer, a netbook, a set-top box (STB), a PDA, an entertainment media system, a cellular telephone, a smartphone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the machine 300. Further, while a single machine 300 is illustrated, the term "machine" may also be taken to include a collection of machines that individually or jointly execute the instructions 310 to perform any one or more of the methodologies discussed herein.

The machine 300 may include processors 302, memory 304, and I/O device interfaces 306, which may be configured to communicate with one another via a bus 344. In an example, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the machine 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within a non-transitory machine-readable medium 320 within the storage unit 318, within one or more of the processors 302 (e.g., within the processor's cache memory), or any suitable combination thereof, during execution thereof by the machine 300.

The I/O device interfaces 306 couple the machine 300 to I/O devices 346. One or more of the I/O devices 346 may be a component of machine 300 or may be separate devices. The I/O device interfaces 306 may include a wide variety of interfaces to the I/O devices 346 used by the machine 300 to receive input, provide output, produce output, transmit information, exchange information, capture measurements, and so on. The specific I/O device interfaces 306 that are included in a particular machine will depend on the type of machine. It will be appreciated that the I/O device interfaces 306 the I/O devices 346 may include many other components that are not shown in FIG. 3. In various examples, the I/O device interfaces 306 may include output component interfaces 328 and input component interfaces 332. The output component interfaces 328 may include interfaces to visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input component interfaces 332 may include interfaces to alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O device interfaces 306 may include biometric component interfaces 334, motion component interfaces 336, environmental component interfaces 338, or position component interfaces 340, among a wide array of other component interfaces. For example, the biometric component interfaces 334 may include interfaces to components used to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion component interfaces 336 may include interfaces to inertial measurement units (IMUs), acceleration sensor components (e.g., accelerometer), gravitation sensor components, rotation sensor components (e.g., gyroscope), and so forth. The environmental component interfaces 338 may include, for example, interfaces to illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding real-world scene. The position component interfaces 340 include interfaces to location sensor components (e.g., a Global Positioning System (GPS) receiver component and/or an Inertial Measurement Unit (IMU)), altitude sensor components (e.g., altimeters or barometers that detect air pressure from which altitude may be derived), orientation sensor components (e.g., magnetometers), and the like.

Communication may be implemented using a wide variety of technologies. The I/O device interfaces 306 further include communication component interfaces 342 operable to couple the machine 300 to a network 322 or devices 324 via a coupling 330 and a coupling 326, respectively. For example, the communication component interfaces 342 may include an interface to a network interface component or another suitable device to interface with the network 322. In further examples, the communication component interfaces 342 may include interfaces to wired communication components, wireless communication components, cellular communication components, Near Field Communication (NFC) components, Bluetooth® components (e.g., Bluetooth® Low Energy), WiFi® components, and other communication components to provide communication via other modalities. The devices 324 may be another machine or any of a wide variety of peripheral devices (e.g., a peripheral device coupled via a USB).

Moreover, the communication component interfaces 342 may include interfaces to components operable to detect identifiers. For example, the communication component interfaces 342 may include interfaces to Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication component interfaces 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication component interfaces 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4:
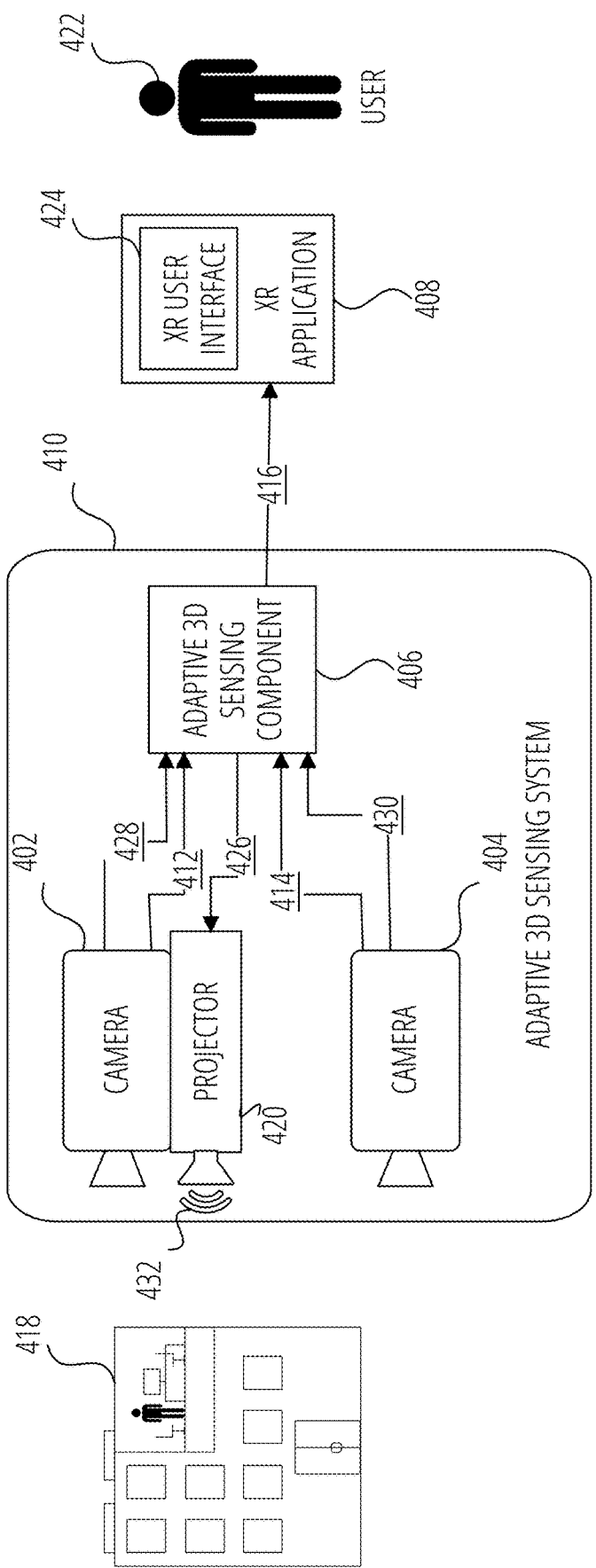
FIG. 4 is an illustration of an adaptive 3D sensing system in accordance with some examples of the present disclosure.

FIG. 4 is an illustration of an adaptive 3D sensing system, in accordance with some examples of the present disclosure. An adaptive 3D sensing system 410 is used by an XR system to generate 3D sensing data 416 and communicate the 3D sensing data 416 to an XR application 408 providing an XR user interface 424 to a user 422 interacting with the XR application 408. The adaptive 3D sensing system 410 comprises one or more cameras, such as camera 402 and camera 404. The adaptive 3D sensing system 410 uses the one or more cameras to capture image data, such as image data 412 and image data 414, of a real-world scene 418. The image data is communicated to an adaptive 3D sensing component 406 of the adaptive 3D sensing system 410. The adaptive 3D sensing component 406 receives the image data and generates projector command data 426 based on the image data (as more fully described in reference to FIG. 8A). The adaptive 3D sensing component 406 communicates the projector command data 426 to a projector 420. The projector 420 receives the projector command data 426 and generates a distributed laser beam 432 based on the projector command data 426. The projector 420 sends the distributed laser beam 432 into areas of the real-world scene 418 using the projector 420 (as more fully described in reference to FIG. 6 and FIG. 7) while the adaptive 3D sensing system 410 captures 3D sensing image data, such as 3D sensing image data 430 and 3D sensing image data 428, of the real-world scene 418 using the one or more cameras. The adaptive 3D sensing component 406 receives the 3D sensing image data and generates the 3D sensing data 416 based on the 3D sensing image data 428 and communicates the 3D sensing data 416 to the XR application 408. The XR application receives the 3D sensing data 416 and uses the 3D sensing data 416 to generate or update the XR user interface 424.

In some examples, the adaptive 3D sensing system 410 is used by an XR system comprising a head-worn device, such as glasses 100 (of FIG. 1) to generate 3D sensing data of a real-world scene being viewed by a user of the XR system and display an XR user interface to the user.

In some examples, the adaptive 3D sensing system 410 is used by an XR system comprising a smartphone, tablet, or other mobile device to generate 3D sensing data of a real-world scene being viewed by a user of the XR system and display an XR user interface to the user.

In some examples, the adaptive 3D sensing system 410 is used by an XR system comprising a computing system, such as a personal computer or the like, to generate 3D sensing data of a real-world scene being viewed by a user of the XR system and display an XR user interface to the user.

In some examples, the adaptive 3D sensing system 410 comprises two or more cameras and two or more projectors in order to capture a large real-world scene 418.

In some examples, a projector of the adaptive 3D sensing system is mounted adjacent to one or more cameras of the adaptive 3D sensing system.

In some examples, a projector of the adaptive 3D sensing system is mounted in a spaced apart position relative to one or more cameras of the adaptive 3D sensing system.

Figure 5:
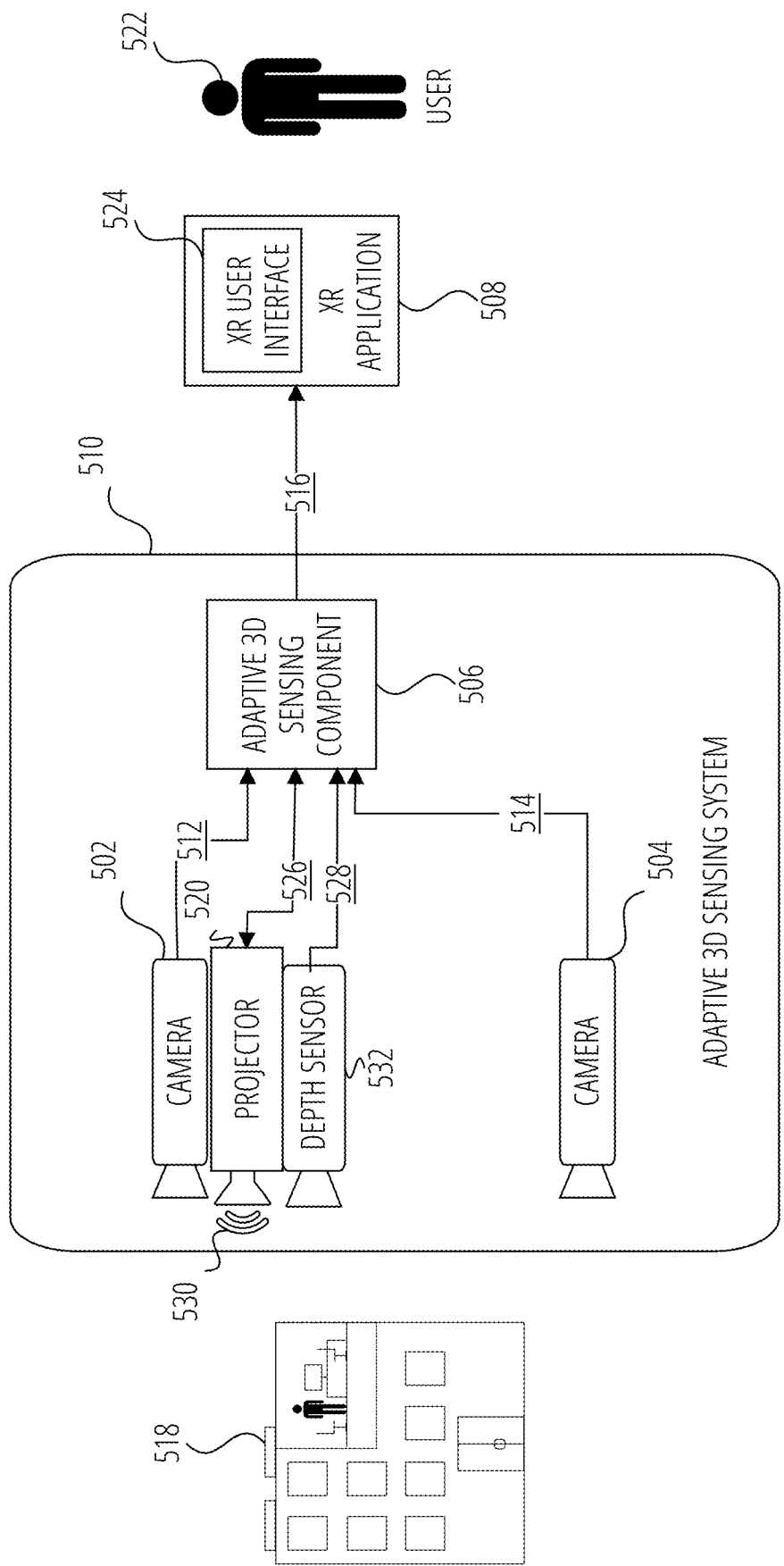
FIG. 5 is an illustration of another adaptive 3D sensing system in accordance with some examples of the present disclosure.

FIG. 5 is an illustration of an adaptive 3D sensing system, in accordance with some examples of the present disclosure. An adaptive 3D sensing system 510 is used by an XR system to generate 3D sensing data 516 and communicate the 3D sensing data 516 to an XR application 508 providing an XR user interface 524 to a user 522 interacting with the XR application 508. The adaptive 3D sensing system 510 comprises one or more cameras, such as camera 502 and camera 504. The adaptive 3D sensing system 510 uses the one or more cameras to capture image data, such as 3D sensing image data 512 and 3D sensing image data 514, of a real-world scene 518. The image data is communicated to an adaptive 3D sensing component 506 of the adaptive 3D sensing system 510. The adaptive 3D sensing component 506 receives the image data and generates projector command data 526 based on the image data (as more fully described in reference to FIG. 8A). The adaptive 3D sensing component 506 communicates the projector command data 526 to a projector 520. The projector 520 receives the projector command data 526 and generates a distributed laser beam 530 based on the projector command data 526. The adaptive 3D sensing system 510 sends the distributed laser beam 530 into areas of the real-world scene 518 using the projector 520 (as more fully described in reference to FIG. 6 and FIG. 7) while the adaptive 3D sensing system 510 captures 3D depth sensor data 528 of the real-world scene 518 using one or more depth sensors 532. The adaptive 3D sensing component 506 receives the 3D depth sensor data 528 and generates the 3D sensing data 516 based on the 3D depth sensor data 528 and communicates the 3D sensing data 516 to the XR application 508. The XR application receives the 3D sensing data 516 and uses the 3D sensing data 516 to generate or update the XR user interface 524.

In some examples, the depth sensor 532 comprises a Light Detection and Ranging-Time of Flight (LIDAR-ToF) depth sensor.

In some examples, the depth sensor 532 comprises a Continuous Wave-Time of Flight (CW-ToF) depth sensor.

In some examples, the depth sensor 532 comprises a Single Photon Avalanche Diode (SPAD)-ToF depth sensor used to estimate depths of the real-world scene 518.

In some examples, the depth sensor 532 comprises a Frequency Modulated Continuous Wave (FMCW)-ToF depth sensor used to estimate depths of the real-world scene 518.

In some examples, the depth sensor 532 is mounted adjacent to one or more projectors 520. In some examples, the depth sensor 532 is mounted in a spaced apart relationship with one or more projectors.

In some examples, the adaptive 3D sensing system 510 is used by an XR system comprising a head-worn device, such as glasses 100 (of FIG. 1) to generate 3D sensing data of a real-world scene being viewed by a user of the XR system and display an XR user interface to the user.

In some examples, the adaptive 3D sensing system 510 is used by an XR system comprising a smartphone, tablet, or other mobile device to generate 3D sensing data of a real-world scene being viewed by a user of the XR system and display an XR user interface to the user.

In some examples, the adaptive 3D sensing system 510 is used by an XR system comprising a computing system, such as a personal computer or the like, to generate 3D sensing data of a real-world scene being viewed by a user of the XR system and display an XR user interface to the user.

In some examples, the adaptive 3D sensing system 510 comprises two or more depth sensors and two or more projectors in order to capture a large real-world scene 418.

Figure 6:
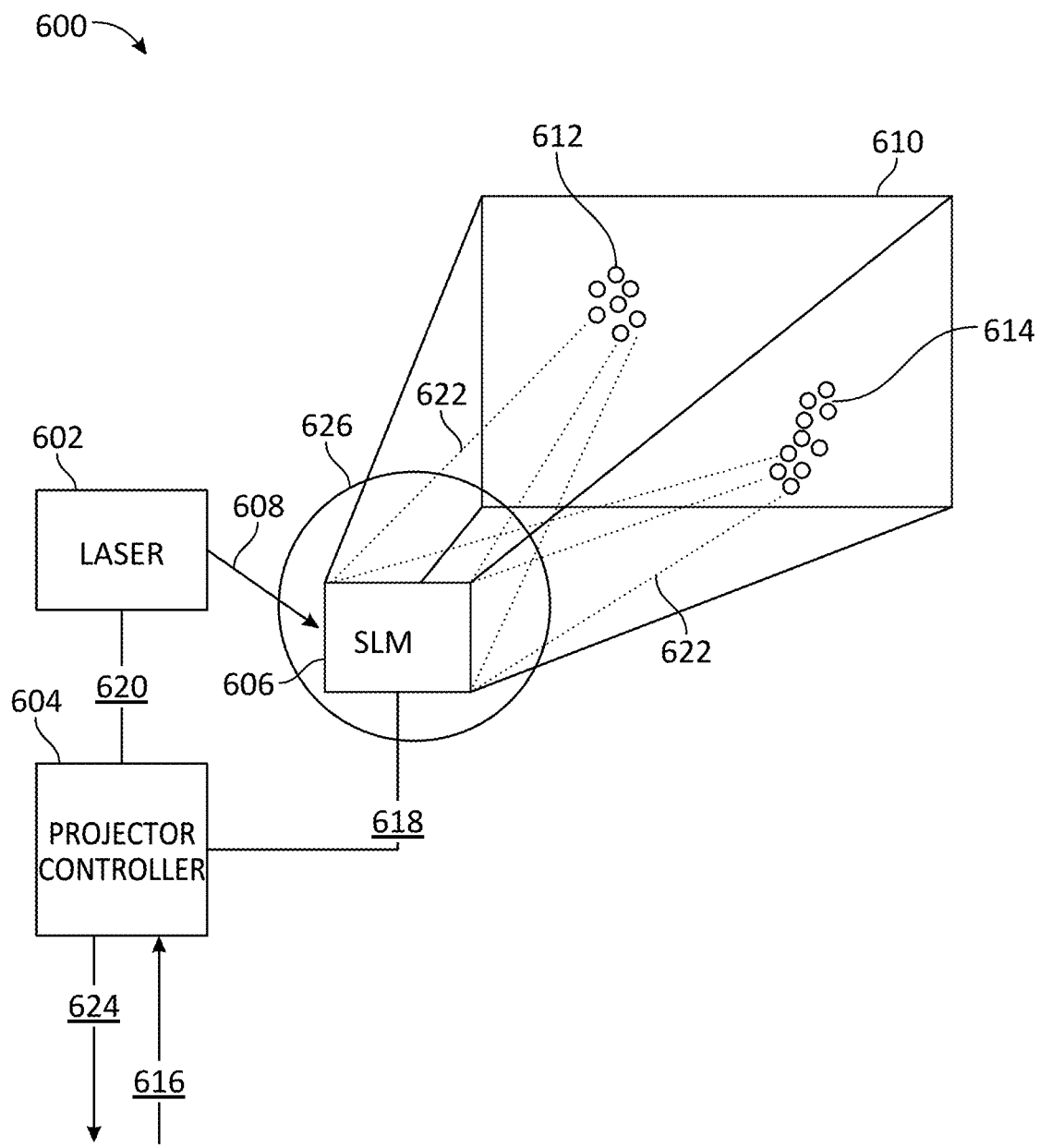
FIG. 6 is an illustration of an SLM-based projector in accordance with some examples of the present disclosure.

FIG. 6 is an illustration of an SLM-based projector, in accordance with some examples of the present disclosure. An adaptive 3D sensing system uses an SLM-based projector 600 to distribute and selectively send a laser beam 608 as a distributed laser beam, such as distributed laser beam 622, into a real-world scene 610. The SLM-based projector 600 includes an SLM 606, a laser 602 that projects a laser beam 608 onto the SLM 606, and a projector controller 604. The SLM is operable to distribute the laser beam freely such that different random dot patterns are projected to areas of the real-world scene, such as area 612 and area 614.

The projector controller 604 is operable to receive projector command data 616 and generate phase mask signals 618 based on the projector command data 616 that cause the SLM 606 to generate a distributed laser beam, such as distributed laser beam 622, using the laser beam 608. The SLM 606 sends the distributed laser beam 622 into one or more areas, such as area 612 and area 614, of a real-world scene 610 based on the projector command data 616. The projector controller 604 is also operable to generate laser control signals 620 based on the projector command data 616 and use the laser control signals 620 to control the laser 602.

In some embodiments, the SLM 606 diffracts the laser beam 608 and distributes the laser beam 608 into a pattern having two or more points or beams at the same time based on the phase mask signals 618. In some embodiments, the SLM 606 distributes the laser beam 608 into an arbitrary pattern based on the phase mask signals 618.

In some embodiments, the SLM 606 is included in an assembly having one or more optical element 626 such as, but not limited to, a lens or the like.

In some examples, the projector controller 604 is operable to generate laser synchronization data 624 of the laser 602 used by the adaptive 3D sensing system to synchronize the capture of 3D sensing image data using a camera or 3D depth sensor data using a depth sensor. For example, the laser synchronization data 624 may include timing data for the powering on and off of the laser 602 for use in determining when to capture images by one or more cameras or for ToF calculations. The laser synchronization data 624 may also include phase data of the laser beam 608 being generated by the laser 602 for use in ToF calculations.

Figure 7:
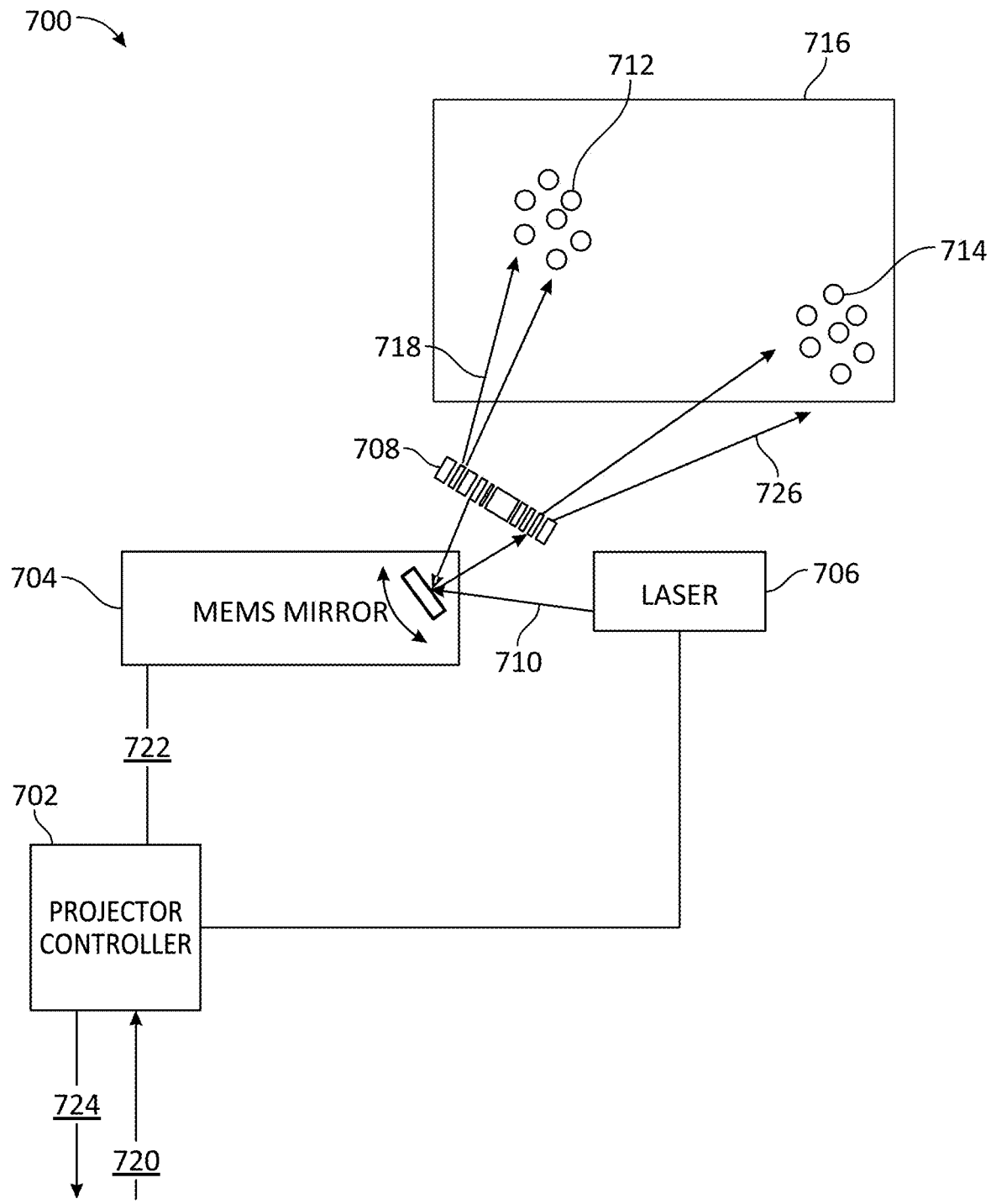
FIG. 7 is an illustration of a MEMS+DOE-based projector in accordance with some examples of the present disclosure.

FIG. 7 is an illustration of a MEMS+DOE-based projector in accordance with some examples of the present disclosure. An adaptive 3D sensing system uses a MEMS+DOE-based projector 700 to generate distributed laser beams, such as distributed laser beam 718 and to selectively focus the distributed laser beams on a real-world scene 716. The MEMS+DOE-based projector 700 includes a DOE 708 having a low dispersion angle, a laser 706, and a moveable MEMS mirror 704 that is operable by a projector controller 702 to move the MEMS mirror 704 to deflect a laser beam 710 through the DOE 708. The projector controller 702 is operable to receive projector command data 720 and generate MEMS mirror control signals 722 based on the projector command data 720. The projector controller 702 communicates the MEMS mirror control signals 722 to cause the MEMS mirror 704 to deflect the laser beam 710 through the DOE 708. As the laser beam 710 passes through the DOE 708, the laser beam 710 is diffracted to generate a distributed laser beam, such as distributed laser beam 718 and distributed laser beam 726. In addition, by positioning the MEMS mirror 704, the projector sends the distributed laser beam into a specified area of the real-world scene 716, such as area 712 and area 714.

In some embodiments, a distributed laser beam generated by passing a laser beam through a DOE includes a randomized pattern created by the DOE. The DOE is constructed in such a way that a grating of the DOE produces the randomized pattern in the distributed laser beam.

In some examples, the projector controller 702 is operable to generate laser synchronization data 724 of the laser 706 used by the adaptive 3D sensing system to synchronize the capture of 3D sensing image data using a camera or 3D depth sensor data using a depth sensor. For example, the laser synchronization data 724 may include timing data for the powering on and off of the laser 706 for use in determining when to capture images by one or more cameras or for ToF calculations. The laser synchronization data 724 may also include phase data of the laser beam 710 being generated by the laser 706 for use in ToF calculations.

Figure 8A:
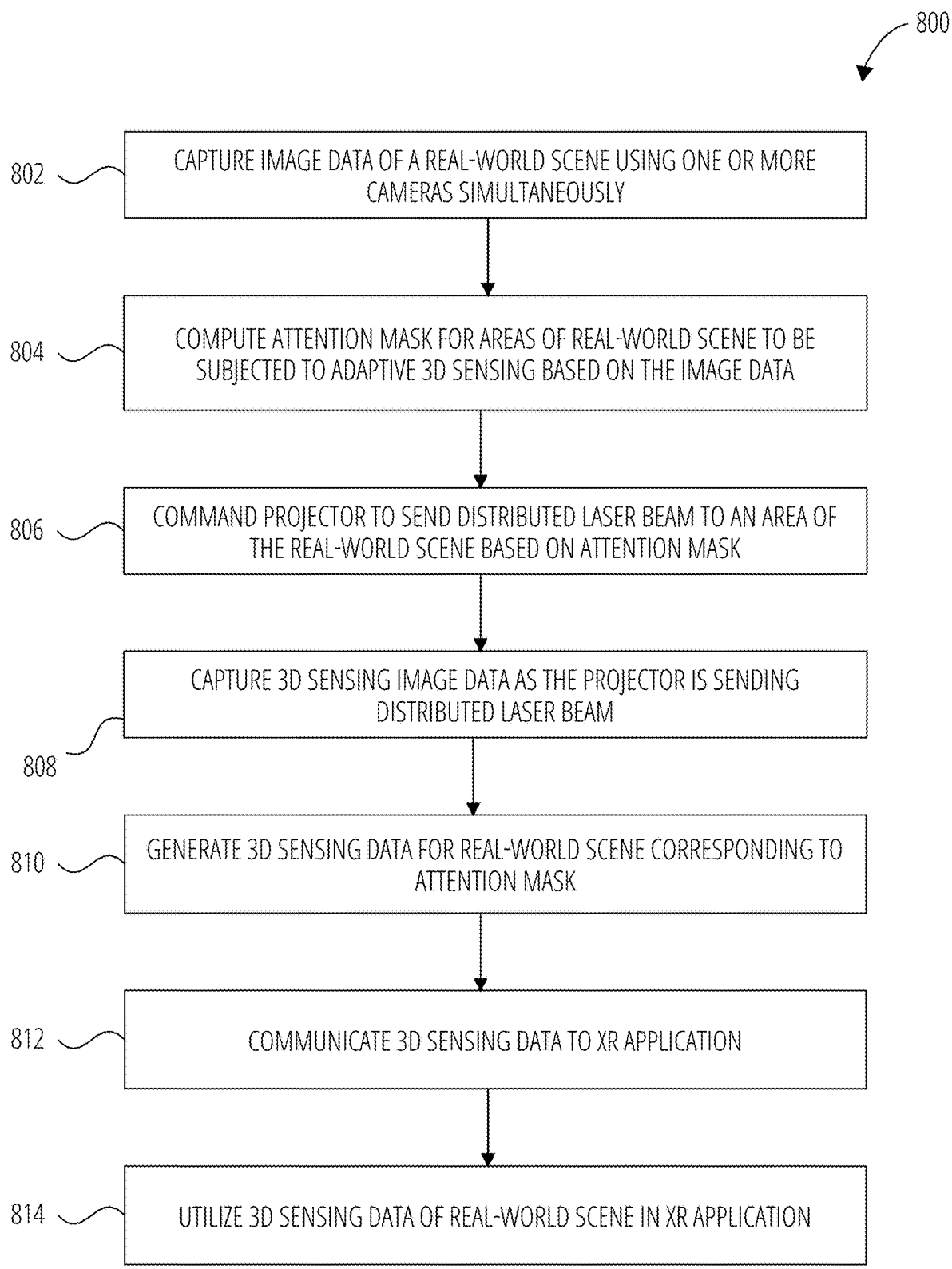
FIG. 8A is a process flow diagram of an adaptive 3D sensing method, in accordance with some examples of the present disclosure.
Figure 8B:
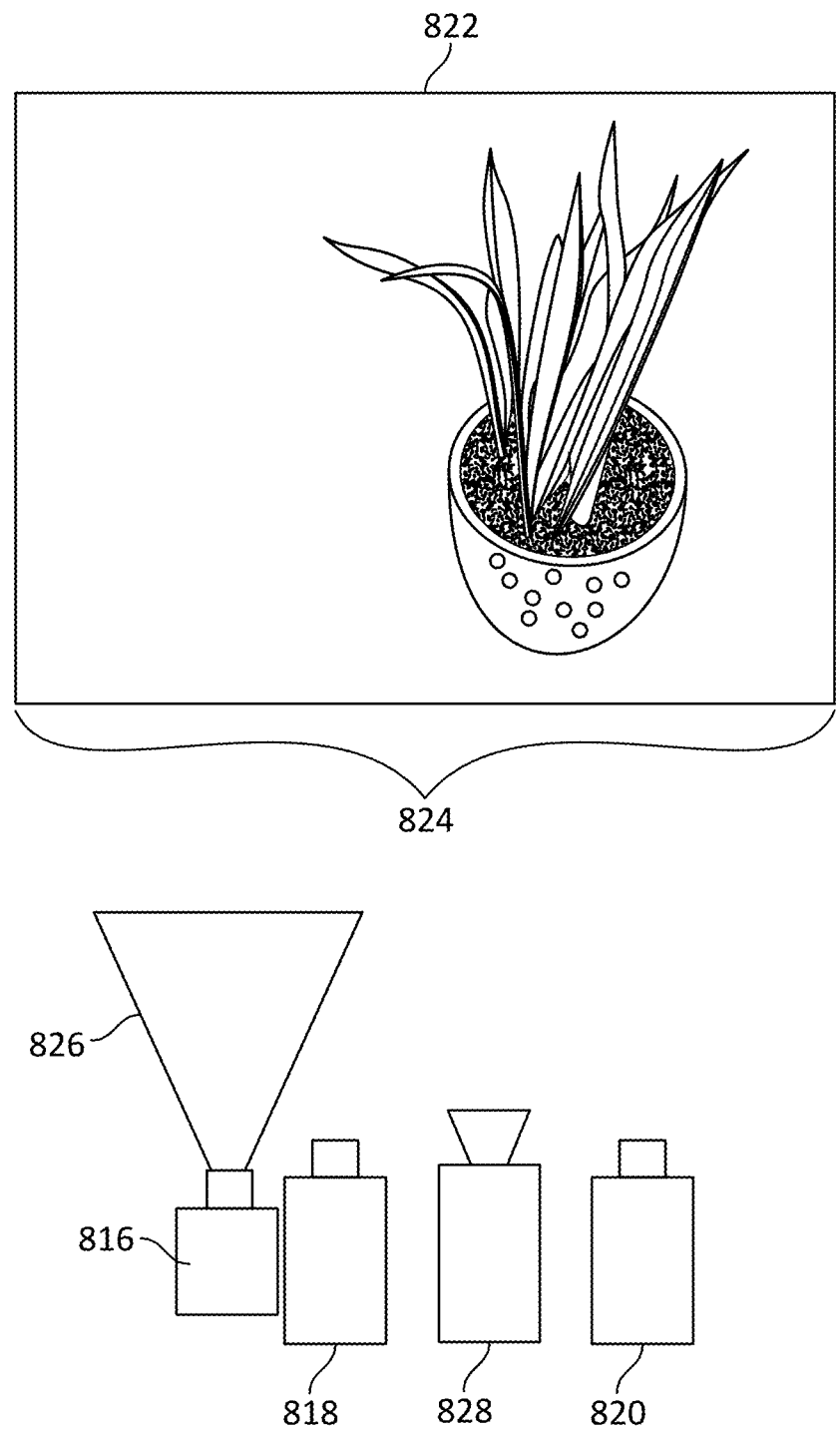
FIG. 8B is a diagram of an operational environment of an adaptive 3D sensing system, in accordance with some examples of the present disclosure
Figure 8C:
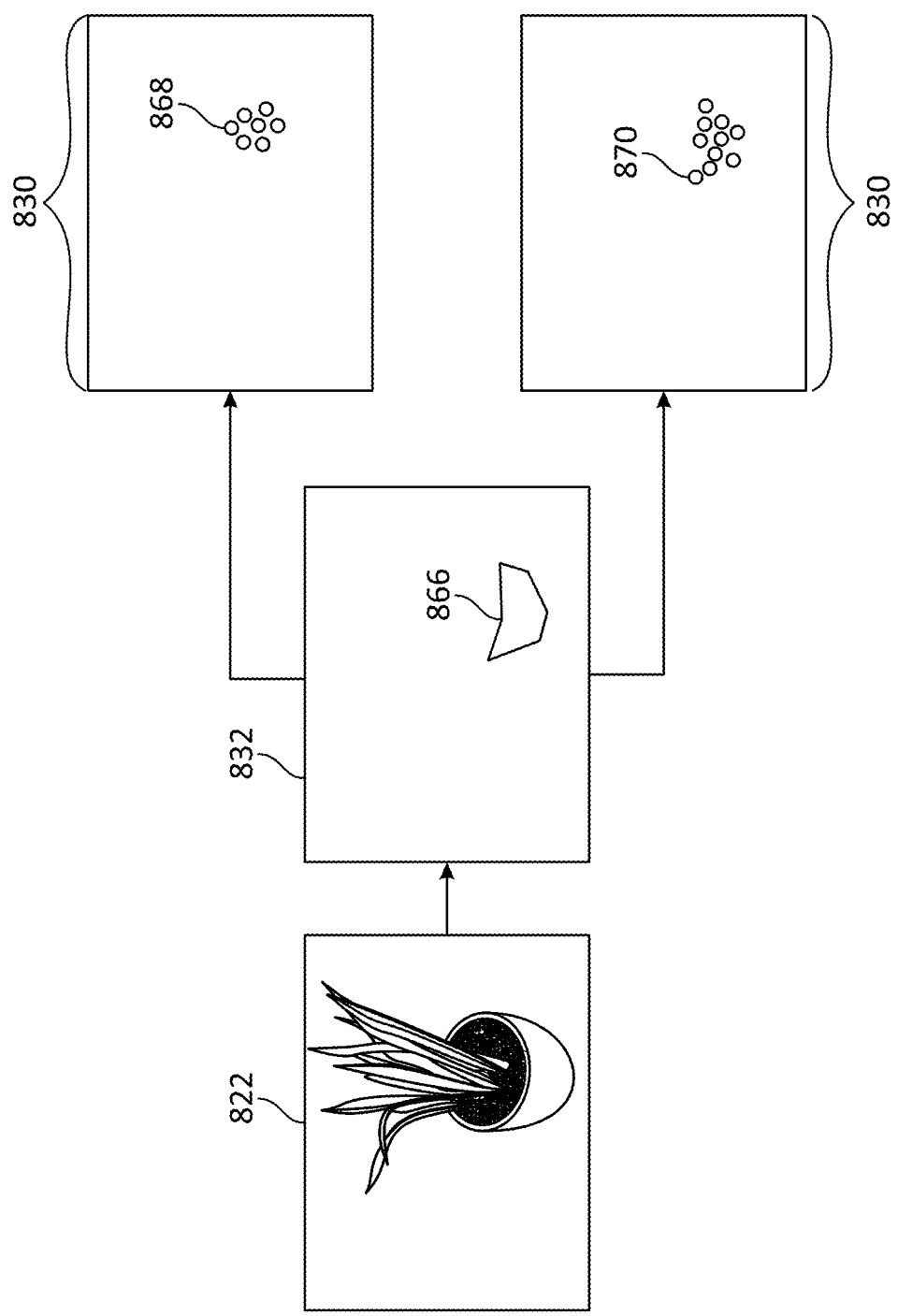
FIG. 8C is an illustration of stages of the adaptive 3D sensing method, in accordance with some examples of the present disclosure
Figure 8D:
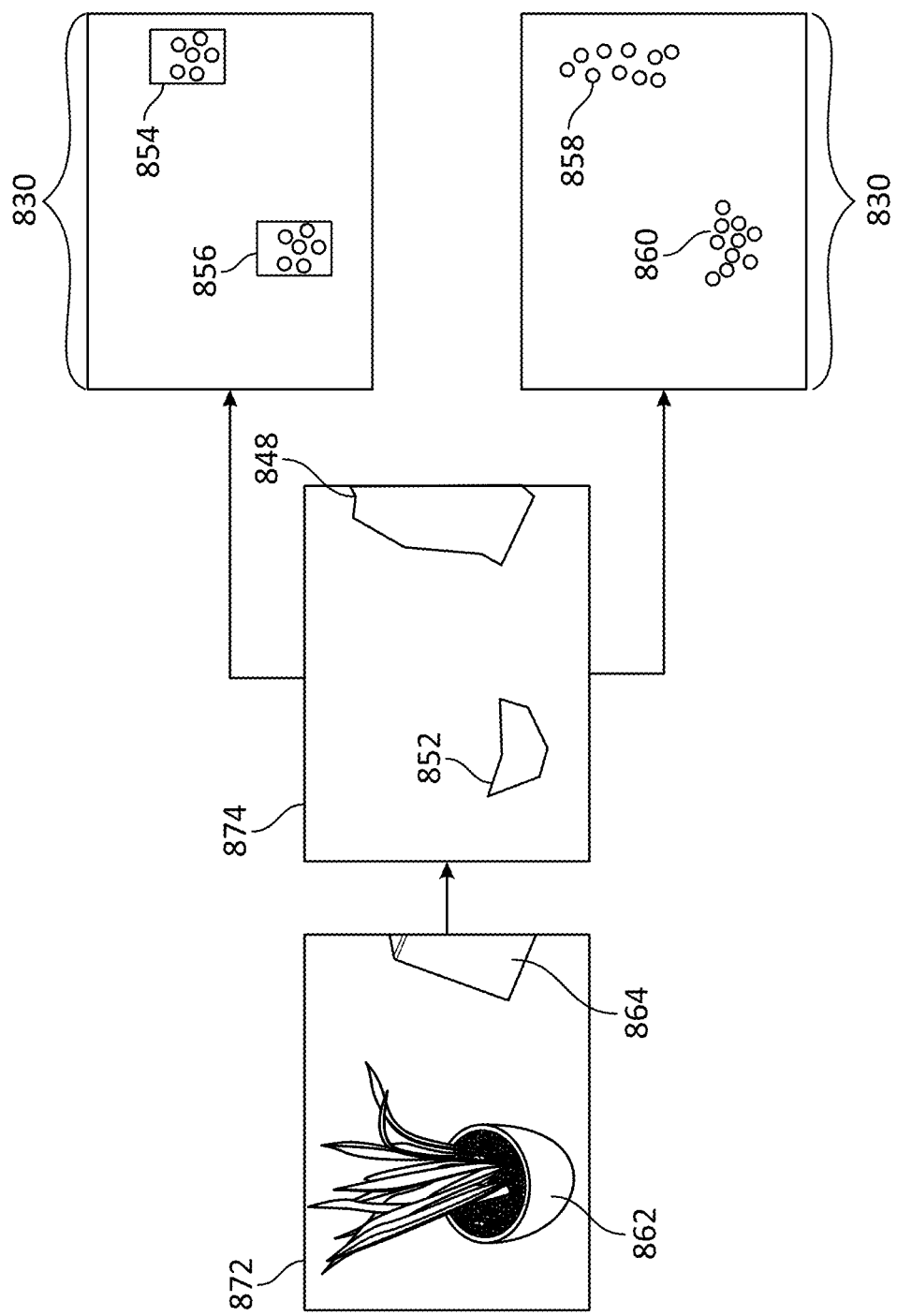
FIG. 8D is an illustration of stages of the adaptive 3D sensing method, in accordance with some examples of the present disclosure
Figure 8E:
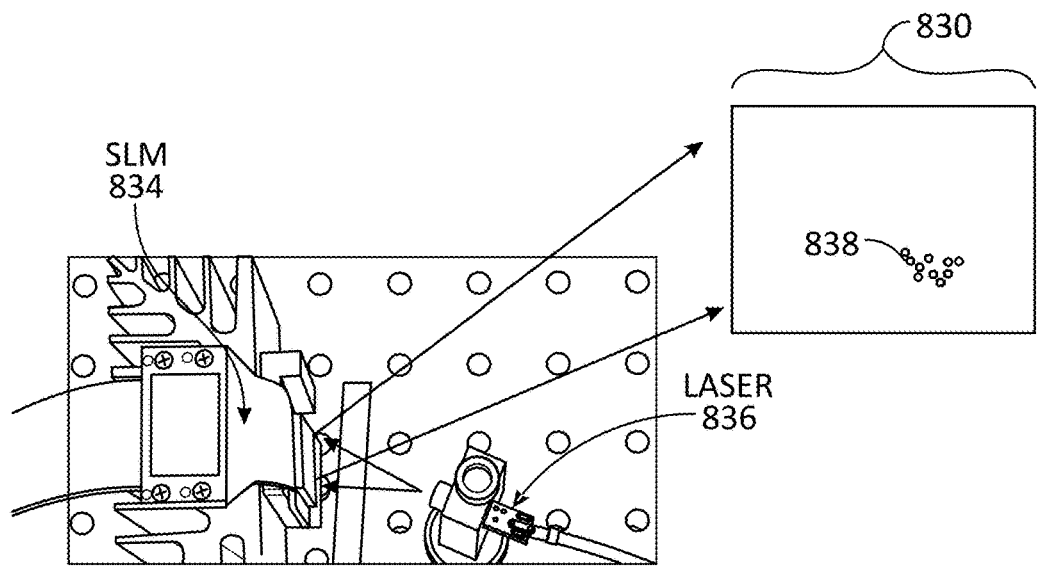
FIG. 8E is an illustration of a projector assembly of an adaptive 3D sensing system, in accordance with some examples of the present disclosure.
Figure 8F:
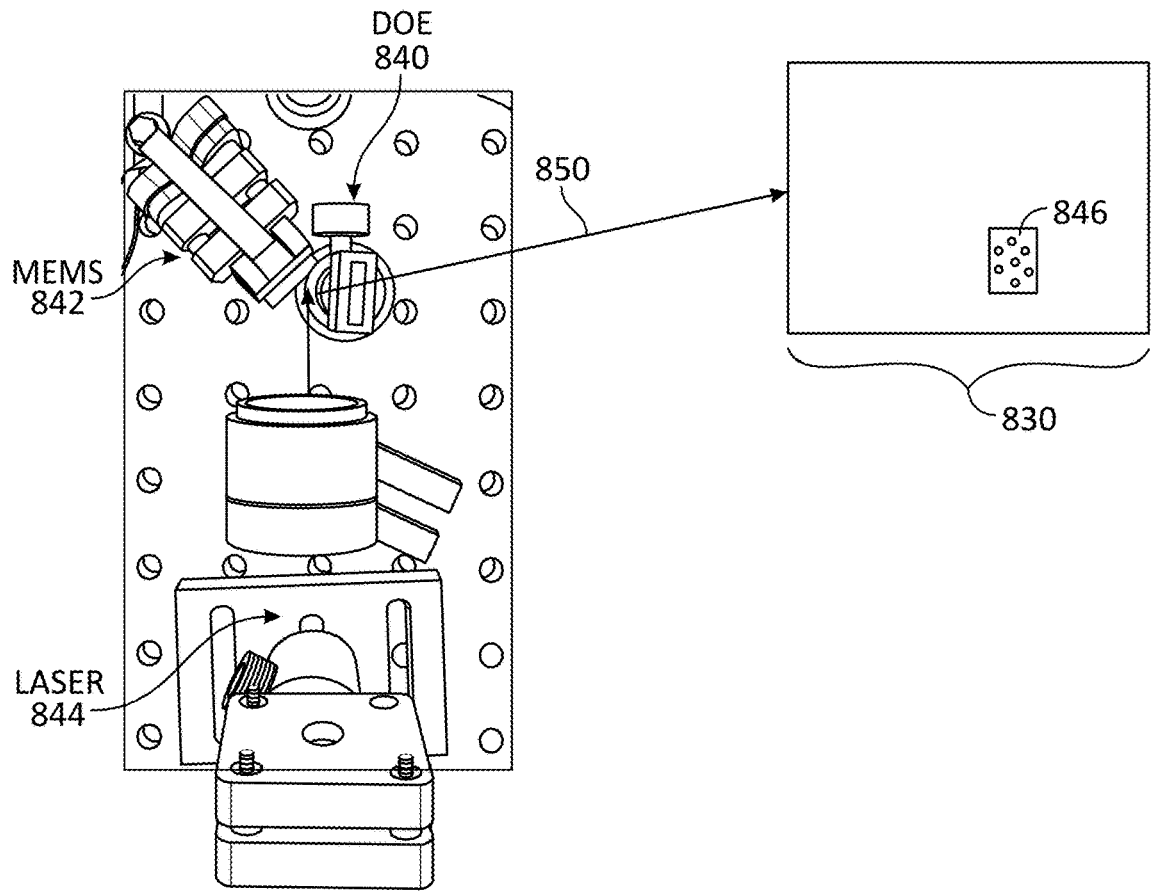
FIG. 8F is an illustration of another projector assembly of an adaptive 3D sensing system, in accordance with some examples of the present disclosure.

FIG. 8A is a process flow diagram of an adaptive 3D sensing method 800, FIG. 8B is a diagram of an operational environment of an adaptive 3D sensing system, FIG. 8C and FIG. 8D are illustrations of stages of the adaptive 3D sensing method 800, and FIG. 8E and FIG. 8F are illustrations of projector assemblies of an adaptive 3D sensing system in accordance with some examples of the present disclosure. An adaptive 3D sensing system uses the adaptive 3D sensing method 800 to perform adaptive 3D sensing of an area of a real-world scene.

In operation 802, an adaptive 3D sensing system captures image data of a real-world scene 822 using one or more cameras simultaneously, such as camera 818 and camera 820.

In operation 804, the adaptive 3D sensing system computes an attention mask 832 for areas 824 of the real-world scene 822 that are to be subjected adaptive 3D sensing by the adaptive 3D sensing system based on the image data. For example, the adaptive 3D sensing system determines an area 824 of the real-world scene 822 to be subjected to adaptive 3D sensing based on a region of the image data corresponding to the area 824 meeting one or more conditions such as, but not limited to: (1) depth confidence is below a specified threshold level for pixels in a region of an image of the image data that corresponds to an area 824; (2) virtual objects of an XR user interface are to be rendered in the area 824 of the real-world scene; and/or (3) an area 824 of the real-world scene 822 has not been mapped into a 3D model of the real-world scene 822 used by an XR application to provide an XR user interface to a user. The attention mask 832 includes masking data, such as masking data 866, used to distribute a laser beam having distributed laser beam patterns, such as distributed laser beam pattern 868 and distributed laser beam pattern 870, into one or more areas, such as area 830, of the real-world scene corresponding to the regions of the image that meet the one or more conditions. Accordingly, the attention mask 832 determines the areas in the real-world scene 822 that will be subject to adaptive 3D sensing by the adaptive 3D sensing system.

In some examples, to determine the depth confidence is below a specified threshold level for pixels in a region of an image that corresponds to the area 824 the adaptive 3D sensing system computes depth estimates and confidence for each pixel of an image of the real-world scene 822 based on the image data. For example, the adaptive 3D sensing system extracts first feature data from first image data received from a first camera and extracts second feature data from second image data received from a second camera. The adaptive 3D sensing system extracts depth estimates for each pixel in the image data based on the first image data and the second image data using stereoscopic image processing methodologies. In some examples, a binocular disparity is computed for a pixel p in the first image data, which establishes a correspondence between the pixel p and a pixel q in the second image data. The disparity is estimated such that the intensity values at one or more pixels surrounding p in the first image data are structurally similar to the intensity values at the pixels surrounding q in the second image data. The adaptive 3D sensing system determines a confidence value for a pixel of the image data based on if this correspondence can be uniquely found at each pixel, i.e., if there is another pixel q' whose surrounding pixels also look similar to p. The higher the uniqueness, the higher the confidence value. When a pixel's estimated confidence value is below a specified threshold confidence value, that means that an area of the real-world scene 822 corresponding to the pixel should be subjected to adaptive 3D sensing by the adaptive 3D sensing system as the depth data for that area of the real-world scene 822 is not reliable. Accordingly, the adaptive 3D sensing system generates an attention mask 832 based on the estimated depth confidence values, for instance by generating an attention mask that directs a distributed laser beam to those areas of a real-world scene where the depth estimate confidence value is below a specified threshold. The adaptive 3D sensing system generates projector command data based on the attention mask 832 and communicates the projector command data to the projector 816 to command the projector 816 to project a distributed laser beam 826 to selectively sense an area 824 of the real-world scene 822 for which the depth estimate confidence values are below a specified confidence value.

In some examples, an adaptive 3D sensing system uses a single camera. The projector 130 generates a known structured light pattern that is deformed as it falls on various 3D surfaces. A single camera is positioned such that an optical axis of the camera is offset from an optical axis of the projector. The adaptive 3D sensing captures image data and estimates depths based on the image data, the known structured light pattern, and the offset between the optical axis of the camera and the optical axis of the projector.

In some examples, an adaptive 3D sensing system generates an attention mask 832 based on real-world scene 822 locations of virtual objects that are to be rendered in an area 824 of the real-world scene 822. For example, the adaptive 3D sensing system receives, from an XR application, coordinates of an area 824 of the real-world scene 822 in which a virtual object of an XR user interface is to be rendered. The adaptive 3D sensing system generates the attention mask 832 based on the coordinates of the area in which the virtual object will be rendered. The adaptive 3D sensing system generates projector command data based on the attention mask 832 and communicates the projector command data to the projector 816 to command the projector 816 to project a distributed laser beam 826 to selectively sense an area 824 of the real-world scene 822 in which the virtual objects will be rendered.

In some examples, an adaptive 3D sensing system generates an attention mask 832 based on areas of the real-world scene 822 that have not yet been mapped into a 3D model of the real-world scene 822 maintained by an XR system providing an XR user interface to a user. The 3D model permits visual placement of virtual objects relative to physical objects by the glasses 100 within the field of view of the user. For example, the XR system continuously generates a 3D model of a real-world scene as a user of an XR system moves through the real-world scene. A tracking component of the XR system estimates a pose of a head-worn device being worn by the user, such as glasses 100. The tracking component uses image data from one or more cameras, such as left camera 114 and right camera 116, and associated position data provided by one or more position components of the XR system, to track a location and determine a pose of the glasses 100 relative to a frame of reference (e.g., real-world scene environment). The tracking component continually gathers and uses updated sensor data describing movements of the glasses 100 to generate and update the 3D model. The XR system detects that a user of the XR system has entered a new area of the real-world scene based on current location data and previous location data included in the 3D model. In response to determining that the user has entered a new area of the real-world scene, the XR system uses adaptive 3D sensing to generate new 3D sensing data mapping the new area of the real-world scene and add the new area of the real-world scene to the 3D model based on the new 3D sensing data.

In operation 806, the adaptive 3D sensing system commands the projector 816 to send a distributed laser beam 826 into one or more specified areas 824 of the real-world scene 822 based on the attention mask 832. For example, the adaptive 3D sensing system generates projector command data for a projector 816 based on the attention mask. The adaptive 3D sensing system communicates the projector command data to the projector 816. The projector 816 receives the projector command data from the adaptive 3D sensing system and sends a distributed laser beam 826 into one or more specified areas 824 of the real-world scene 822 that are being subjected to adaptive 3D sensing based on the areas being specified in attention mask 832.

In some examples, the projector 816 comprises a DOE 840, a laser 844, and a moveable MEMS mirror 842 that is operable to deflect a laser beam generated by the laser 844 through the DOE 840. The DOE generates a distributed laser beam 850 having a distributed laser beam pattern 846 using the laser beam and sends the distributed laser beam 850 into one or more area 830 of the real-world scene 822 based on the attention mask 832.

In some examples, the projector 816 comprises a laser 836 and an SLM 834. The SLM 834 is operable to generate a distributed laser beam pattern 838 from a laser beam generated by the laser 836 and send the distributed laser beam pattern 838 into one or more specified area 830 of the real-world scene 822 based on the attention mask 832.

In some examples, in operation 808, the adaptive 3D sensing system uses the cameras 818 and 820 to capture 3D sensing image data of the real-world scene 822 in real-time while the projector 816 sends a distributed laser beam into the one or more areas 824. In operation 810, the adaptive 3D sensing system generates 3D sensing data for the one or more areas 824 of the real-world scene 822 based on the 3D sensing image data captured by the one or more cameras.

In some examples, in operation 808, the adaptive 3D sensing system uses one or more depth sensors 828 to capture 3D depth sensor data of the real-world scene 822 in real-time while the projector 816 sends a distributed laser beam into the one or more areas 824. In operation 810, the adaptive 3D sensing system generates 3D sensing data for the area 824 of the real-world scene 822 based on 3D depth sensor data captured by the one or more depth sensors 532.

In some examples, a real-world scene 872 will include two or more areas, such as area 862 and area 864, comprising the area 830 that are to be subjected to adaptive 3D sensing. The adaptive 3D sensing system computes an attention mask 874 having masking data, such as masking data 852 and masking data 848 corresponding to the areas 862 and 864. The adaptive 3D sensing system sends a distributed laser beam having distributed laser beam patterns into the area 830 based on the attention mask 874. In a case the adaptive 3D sensing system is using an SLM-based projector, the patterns of 830 include distributed laser beam patterns such as distributed laser beam pattern 860 and distributed laser beam pattern 858. In a case the adaptive 3D sensing system is using a MEMS+DOE-based projector, the patterns of 830 include distributed laser beam patterns such as distributed laser beam pattern 856 and distributed laser beam pattern 854.

In some examples, during a depth frame's exposure, a MEMS mirror 842 does not rotate and deflects a laser pattern to one location deemed to be of interest. In some examples, during a depth frame's exposure, a MEMS mirror 842 rotates to deflect a laser pattern to several locations while capturing the depth frame; here in some examples, the camera captures several frames, each of which correspond to a pattern location, thereby increasing a signal-to-noise ratio as compared to capturing one frame when ambient lighting noise is elevated.

In operation 812, the adaptive 3D sensing system communicates the 3D sensing data to the XR application.

In operation 814, the XR application uses the 3D sensing data to provide or update an XR user interface being provided to a user by the XR application.

Figure 9:
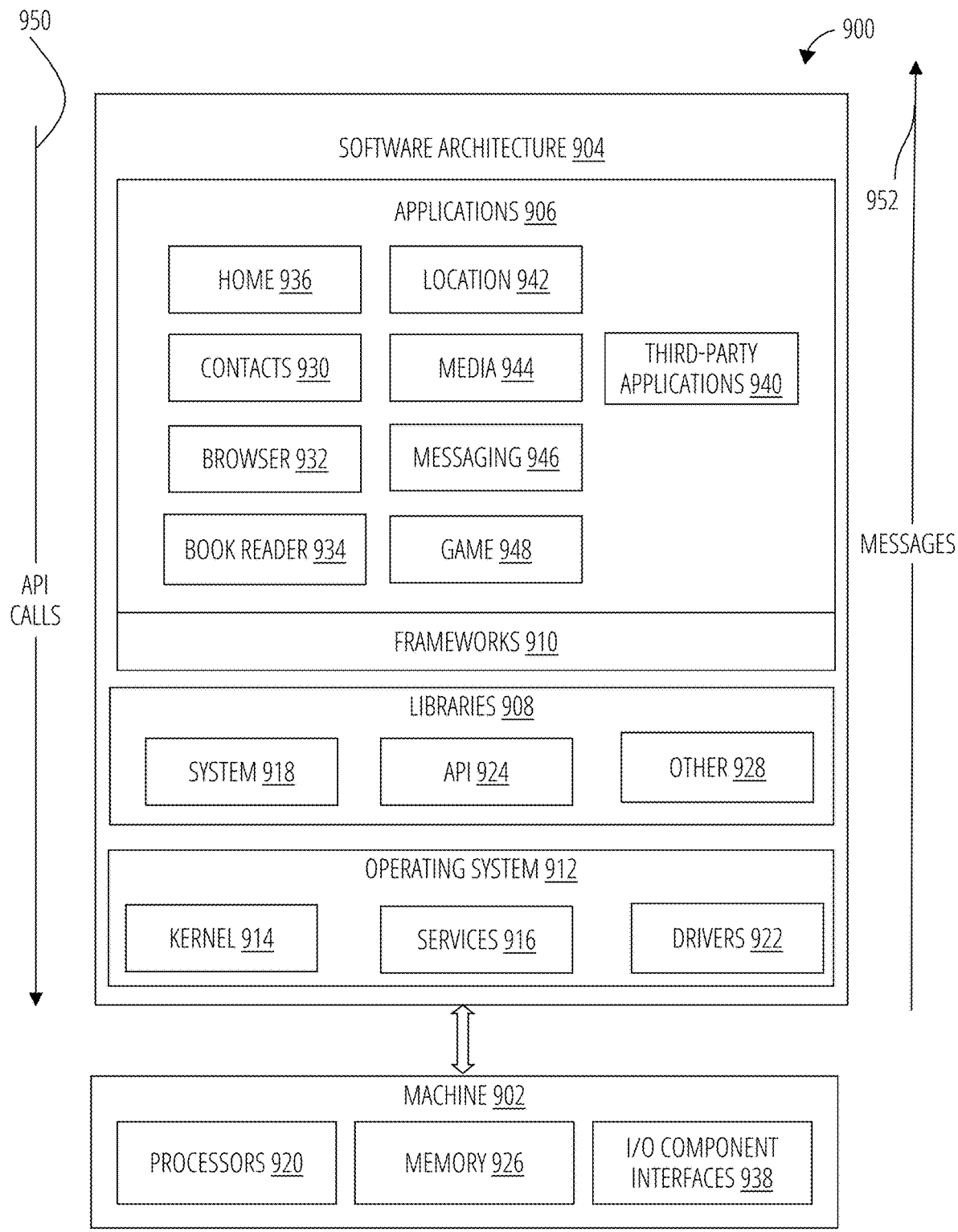
FIG. 9 is a block diagram showing a software architecture within which the present disclosure may be implemented, in accordance with some examples.

FIG. 9 is a block diagram 900 illustrating a software architecture 904, which can be installed on any one or more of the devices described herein. The software architecture 904 is supported by hardware such as a machine 902 that includes processors 920, memory 926, and I/O component interfaces 938. In this example, the software architecture 904 can be conceptualized as a stack of layers, where individual layers provide a particular functionality. The software architecture 904 includes layers such as an operating system 912, libraries 908, frameworks 910, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionalities. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 908 provide a low-level common infrastructure used by the applications 906. The libraries 908 can include system libraries 918 (e.g., C standard library) that provide functions such as memory allocation functions, string manipulation functions, mathematic functions, and the like. In addition, the libraries 908 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 908 can also include a wide variety of other libraries 928 to provide many other APIs to the applications 906.

The frameworks 910 provide a high-level common infrastructure that is used by the applications 906. For example, the frameworks 910 provide various graphical user interface (GUI) functions, high-level resource management, and high-level location services. The frameworks 910 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as third-party applications 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party applications 940 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 940 can invoke the API calls 950 provided by the operating system 912 to facilitate functionality described herein.

Figure 10:
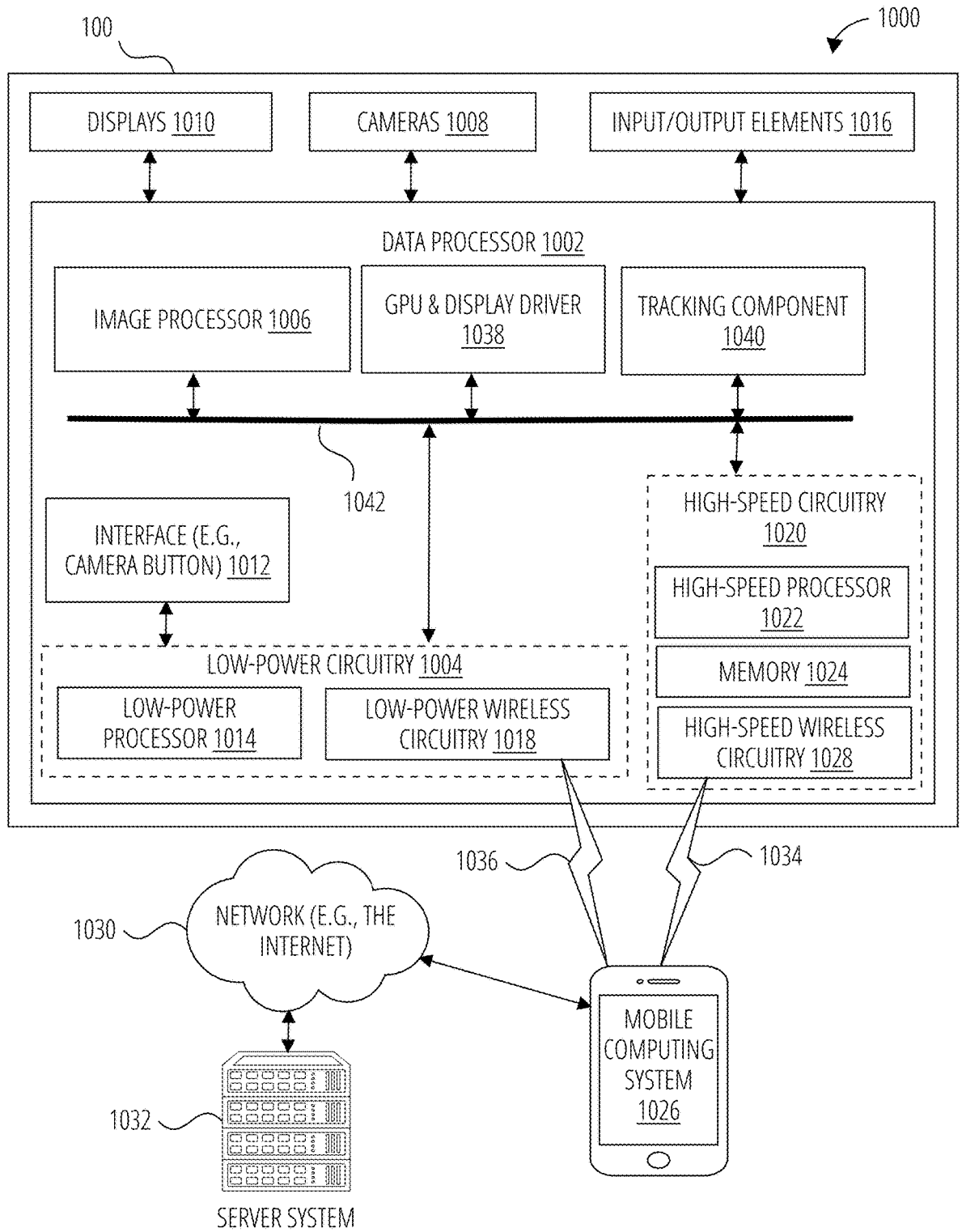
FIG. 10 is a block diagram illustrating a networked system including details of a head-worn XR system, in accordance with some examples.

FIG. 10 is a block diagram illustrating a networked system 1000 including details of the glasses 100, in accordance with some examples. The networked system 1000 includes the glasses 100, a mobile computing system 1026, and a server system 1032. The mobile computing system 1026 may be a smartphone, tablet, phablet, laptop computer, access point, or any other such device capable of connecting with the glasses 100 using a low-power wireless connection 1036 and/or a high-speed wireless connection 1034. The mobile computing system 1026 is connected to the server system 1032 via the network 1030. The network 1030 may include any combination of wired and wireless connections. The server system 1032 may be one or more computing devices as part of a service or network computing system. The mobile computing system 1026 and any elements of the server system 1032 and network 1030 may be implemented using details of the software architecture 904 or the machine 300 described in FIG. 9 and FIG. 3 respectively.

The glasses 100 include a data processor 1002, displays 1010, one or more cameras 1008, and additional input/output elements 1016. The input/output elements 1016 may include microphones, audio speakers, biometric sensors, additional sensors, or additional display elements integrated with the data processor 1002. Examples of the input/output elements 1016 are discussed further with respect to FIG. 9 and FIG. 3. For example, the input/output elements 1016 may include any of I/O device interfaces 306 including output component interfaces 328, motion component interfaces 336, and so forth. Examples of the displays 1010 are discussed in FIG. 2. In the particular examples described herein, the displays 1010 include a display for the user's left and right eyes.

The data processor 1002 includes an image processor 1006 (e.g., a video processor), a GPU & display driver 1038, a tracking component 1040, an interface 1012, low-power circuitry 1004, and high-speed circuitry 1020. The components of the data processor 1002 are interconnected by a bus 1042.

The interface 1012 refers to any source of a user command that is provided to the data processor 1002. In one or more examples, the interface 1012 is a physical button that, when depressed, sends a user input signal from the interface 1012 to a low-power processor 1014. A depression of such button followed by an immediate release may be processed by the low-power processor 1014 as a request to capture a single image, or vice versa. A depression of such a button for a first period of time may be processed by the low-power processor 1014 as a request to capture video data while the button is depressed, and to cease video capture when the button is released, with the video captured while the button was depressed stored as a single video file. Alternatively, depression of a button for an extended period of time may capture a still image. In some examples, the interface 1012 may be any mechanical switch or physical interface capable of accepting user inputs associated with a request for data from the cameras 1008. In other examples, the interface 1012 may have a software component, or may be associated with a command received wirelessly from another source, such as from the mobile computing system 1026.

The image processor 1006 includes circuitry to receive signals from the cameras 1008 and process those signals from the cameras 1008 into a format suitable for storage in the memory 1024 or for transmission to the mobile computing system 1026. In one or more examples, the image processor 1006 (e.g., video processor) comprises a microprocessor integrated circuit (IC) customized for processing sensor data from the cameras 1008, along with volatile memory used by the microprocessor in operation.

The low-power circuitry 1004 includes the low-power processor 1014 and the low-power wireless circuitry 1018. These elements of the low-power circuitry 1004 may be implemented as separate elements or may be implemented on a single IC as part of a system on a single chip. The low-power processor 1014 includes logic for managing the other elements of the glasses 100. As described above, for example, the low-power processor 1014 may accept user input signals from the interface 1012. The low-power processor 1014 may also be configured to receive input signals or instruction communications from the mobile computing system 1026 via the low-power wireless connection 1036. The low-power wireless circuitry 1018 includes circuit elements for implementing a low-power wireless communication system. Bluetooth™ Smart, also known as Bluetooth™ low energy, is one standard implementation of a low power wireless communication system that may be used to implement the low-power wireless circuitry 1018. In other examples, other low power communication systems may be used.

The high-speed circuitry 1020 includes a high-speed processor 1022, a memory 1024, and a high-speed wireless circuitry 1028. The high-speed processor 1022 may be any processor capable of managing high-speed communications and operation of any general computing system used for the data processor 1002. The high-speed processor 1022 includes processing resources used for managing high-speed data transfers on the high-speed wireless connection 1034 using the high-speed wireless circuitry 1028. In some examples, the high-speed processor 1022 executes an operating system such as a LINUX operating system or other such operating system such as the operating system 912 of FIG. 9. In addition to any other responsibilities, the high-speed processor 1022 executing a software architecture for the data processor 1002 is used to manage data transfers with the high-speed wireless circuitry 1028. In some examples, the high-speed wireless circuitry 1028 is configured to implement Institute of Electrical and Electronic Engineers (IEEE) 802.11 communication standards, also referred to herein as Wi-Fi. In other examples, other high-speed communications standards may be implemented by the high-speed wireless circuitry 1028.

The memory 1024 includes any storage device capable of storing camera data generated by the cameras 1008 and the image processor 1006. While the memory 1024 is shown as integrated with the high-speed circuitry 1020, in other examples, the memory 1024 may be an independent standalone element of the data processor 1002. In some such examples, electrical routing lines may provide a connection through a chip that includes the high-speed processor 1022 from image processor 1006 or the low-power processor 1014 to the memory 1024. In other examples, the high-speed processor 1022 may manage addressing of the memory 1024 such that the low-power processor 1014 will boot the high-speed processor 1022 any time that a read or write operation involving the memory 1024 is desired.

The tracking component 1040 estimates a pose of the glasses 100. For example, the tracking component 1040 uses image data and associated inertial data from the cameras 1008 and the position component interfaces 340, as well as GPS data, to track a location and determine a pose of the glasses 100 relative to a frame of reference (e.g., real-world scene environment). The tracking component 1040 continually gathers and uses updated sensor data describing movements of the glasses 100 to determine updated three-dimensional poses of the glasses 100 that indicate changes in the relative position and orientation relative to physical objects in the real-world scene environment. The tracking component 1040 permits visual placement of virtual objects relative to physical objects by the glasses 100 within the field of view of the user via the displays 1010.

The GPU & display driver 1038 may use the pose of the glasses 100 to generate frames of virtual content or other content to be presented on the displays 1010 when the glasses 100 are functioning in a traditional augmented reality mode. In this mode, the GPU & display driver 1038 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the mobile computing system 1026, or on a remote server. For example, one or more functions or operations described herein may be performed by one of the applications 906 such as messaging application 946.

Figure 11:
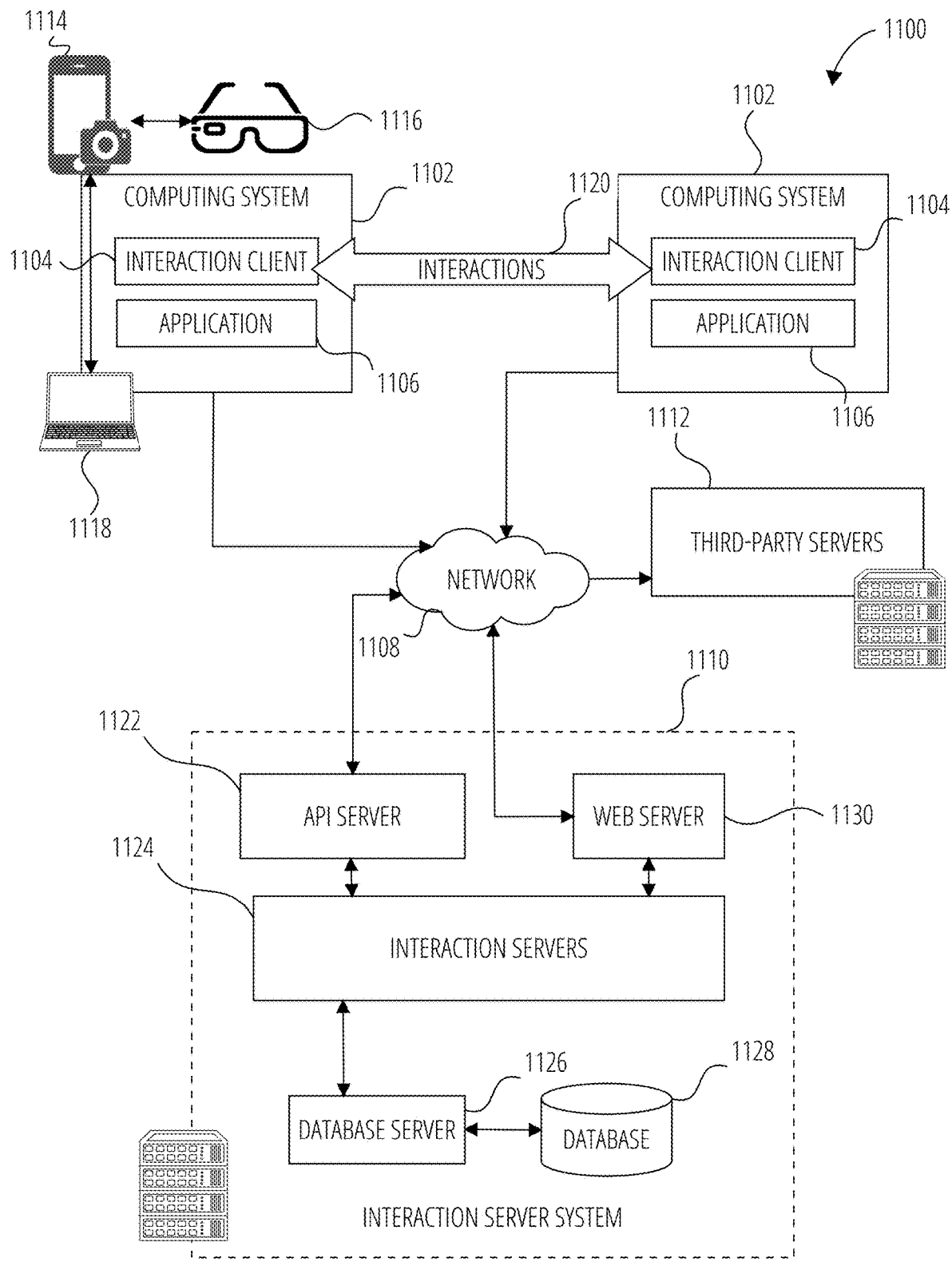
FIG. 11 is a diagrammatic representation of a networked environment in which the present disclosure may be deployed, according to some examples.

FIG. 11 is a block diagram showing an example interaction system 1100 for facilitating interactions (e.g., exchanging text messages, conducting text audio and video calls, or playing games) over a network. The interaction system 1100 includes multiple computing systems 1102, each of which hosts multiple applications, including an interaction client 1104 and other applications 1106. Each interaction client 1104 is communicatively coupled, via one or more communication networks including a network 1108 (e.g., the Internet), to other instances of the interaction client 1104 (e.g., hosted on respective other computing systems 1102), an interaction server system 1110 and third-party servers 1112). An interaction client 1104 can also communicate with locally hosted applications 1106 using Applications Program Interfaces (APIs).

Each computing system 1102 may comprise one or more user devices, such as a mobile device 1114, head-worn XR system 1116, and a computer client device 1118 that are communicatively connected to exchange data and messages.

An interaction client 1104 interacts with other interaction clients 1104 and with the interaction server system 1110 via the network 1108. The data exchanged between the interaction clients 1104 (e.g., interactions 1120) and between the interaction clients 1104 and the interaction server system 1110 includes functions (e.g., commands to invoke functions) and payload data (e.g., text, audio, video, or other multimedia data).

The interaction server system 1110 provides server-side functionality via the network 1108 to the interaction clients 1104. While certain functions of the interaction system 1100 are described herein as being performed by either an interaction client 1104 or by the interaction server system 1110, the location of certain functionality either within the interaction client 1104 or the interaction server system 1110 may be a design choice. For example, it may be technically preferable to initially deploy particular technology and functionality within the interaction server system 1110 but to later migrate this technology and functionality to the interaction client 1104 where a computing system 1102 has sufficient processing capacity.

The interaction server system 1110 supports various services and operations that are provided to the interaction clients 1104. Such operations include transmitting data to, receiving data from, and processing data generated by the interaction clients 1104. This data may include message content, client device information, geolocation information, media augmentation and overlays, message content persistence conditions, social network information, and live event information. Data exchanges within the interaction system 1100 are invoked and controlled through functions available via user interfaces (UIs) of the interaction clients 1104.

Turning now specifically to the interaction server system 1110, an Application Program Interface (API) server 1122 is coupled to and provides programmatic interfaces to Interaction servers 1124, making the functions of the Interaction servers 1124 accessible to interaction clients 1104, other applications 1106 and third-party server 1112. The Interaction servers 1124 are communicatively coupled to a database server 1126, facilitating access to a database 1128 that stores data associated with interactions processed by the Interaction servers 1124. Similarly, a web server 1130 is coupled to the Interaction servers 1124 and provides web-based interfaces to the Interaction servers 1124. To this end, the web server 1130 processes incoming network requests over the Hypertext Transfer Protocol (HTTP) and several other related protocols.

The Application Program Interface (API) server 1122 receives and transmits interaction data (e.g., commands and message payloads) between the Interaction servers 1124 and the computing systems 1102 (and, for example, interaction clients 1104 and other application 1106) and the third-party server 1112. Specifically, the Application Program Interface (API) server 1122 provides a set of interfaces (e.g., routines and protocols) that can be called or queried by the interaction client 1104 and other applications 1106 to invoke functionality of the Interaction servers 1124. The Application Program Interface (API) server 1122 exposes various functions supported by the Interaction servers 1124, including account registration; login functionality; the sending of interaction data, via the Interaction servers 1124, from a particular interaction client 1104 to another interaction client 1104; the communication of media files (e.g., images or video) from an interaction client 1104 to the Interaction servers 1124; the settings of a collection of media data (e.g., a story); the retrieval of a list of friends of a user of a computing system 1102; the retrieval of messages and content; the addition and deletion of entities (e.g., friends) to an entity graph (e.g., a social graph); the location of friends within a social graph; and opening an application event (e.g., relating to the interaction client 1104).

Returning to the interaction client 1104, features and functions of an external resource (e.g., a linked application 1106 or applet) are made available to a user via an interface of the interaction client 1104. In this context, "external" refers to the fact that the application 1106 or applet is external to the interaction client 1104. The external resource is often provided by a third party but may also be provided by the creator or provider of the interaction client 1104. The interaction client 1104 receives a user selection of an option to launch or access features of such an external resource. The external resource may be the application 1106 installed on the computing system 1102 (e.g., a "native app"), or a small-scale version of the application (e.g., an "applet") that is hosted on the computing system 1102 or remote of the computing system 1102 (e.g., on third-party servers 1112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 1104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 1104 determines whether the selected external resource is a web-based external resource or a locally-installed application 1106. In some cases, applications 1106 that are locally installed on the computing system 1102 can be launched independently of and separately from the interaction client 1104, such as by selecting an icon corresponding to the application 1106 on a home screen of the computing system 1102. Small-scale versions of such applications can be launched or accessed via the interaction client 1104 and, in some examples, no or limited portions of the small-scale application can be accessed outside of the interaction client 1104. The small-scale application can be launched by the interaction client 1104 receiving, from a third-party server 1112 for example, a markup-language document associated with the small-scale application and processing such a document.

In response to determining that the external resource is a locally-installed application 1106, the interaction client 1104 instructs the computing system 1102 to launch the external resource by executing locally-stored code corresponding to the external resource. In response to determining that the external resource is a web-based resource, the interaction client 1104 communicates with the third-party servers 1112 (for example) to obtain a markup-language document corresponding to the selected external resource. The interaction client 1104 then processes the obtained markup-language document to present the web-based external resource within a user interface of the interaction client 1104.

The interaction client 1104 can notify a user of the computing system 1102, or other users related to such a user (e.g., "friends"), of activity taking place in one or more external resources. For example, the interaction client 1104 can provide participants in a conversation (e.g., a chat session) in the interaction client 1104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 1104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 1104. The external resource can selectively include different media items in the responses, based on a current context of the external resource.

The interaction client 1104 can present a list of the available external resources (e.g., applications 1106 or applets) to a user to launch or access a given external resource. This list can be presented in a context-sensitive menu. For example, the icons representing different ones of the application 1106 (or applets) can vary based on how the menu is launched by the user (e.g., from a conversation interface or from a non-conversation interface).

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "machine-readable medium" refers to both machine-storage media and transmission media. Thus, the terms include both storage devices/media and carrier waves/modulated data signals. The terms "machine-readable medium," "machine-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:
1. A system comprising:
one or more cameras;
one or more projectors;

one or more processors operably connected to the one or more cameras and the one or more projectors; and a memory operably connected to the one or more processors, the memory storing instructions that, when executed by the one or more processors, cause the system to perform operations comprising:

capturing, using the one or more cameras, image data of a real-world scene;

computing an attention mask based on the image data;

commanding the one or more projectors to send a distributed laser beam into an area of the real-world scene based on the attention mask;

capturing, using the one or more cameras, three-dimensional (3D) sensing image data of the area of the real-world scene while one or more projectors are sending the distributed laser beam into the area of the real-world scene; and generating 3D sensing data for the real-world scene based on the 3D sensing image data.

2. The system of claim 1, wherein the one or more projectors are Spatial Light Modulator (SLM)-based projectors.

3. The system of claim 1, wherein the one or more projectors are Microelectromechanical System (MEMS)+Diffractive Optical Element (DOE)-based projectors.

4. The system of claim 3, wherein the one or more MEMS+DOE-based projectors generates the distributed laser beam to include a randomized pattern.

5. The system of claim 1, wherein the operations further comprise:

determining the area of the real-world scene based on a depth estimate confidence value.

6. The system of claim 1, wherein the operations further comprise:

determining the area of the real-world scene based on a location in the real-world scene of a virtual object of an eXtended Reality (XR) user interface of an XR application.

7. The system of claim 1, wherein the operations further comprise:

generating a 3D model of the real-world scene based on the image data of the real-world scene;

determining that the area of the real-world scene is not mapped in the 3D model based on location data of the system; and specifying the area of the real-world scene in response to determining that the area of the real-world scene is not mapped in the 3D model.

8. The system of claim 1, wherein the system further comprises a head-worn device.

9. The system of claim 1, wherein the system further comprises a smartphone.

10. A computer-implemented method comprising:

capturing, using one or more cameras of a system, image data of a real-world scene;

computing an attention mask based on the image data;

commanding one or more projectors of the system to send a distributed laser beam into an area of the real-world scene based on the attention mask;

capturing, using the one or more cameras, three-dimensional (3D) sensing image data of the area of the real-world scene while one or more projectors are sending the distributed laser beam into the area of the real-world scene; and generating 3D sensing data for the real-world scene based on the 3D sensing image data.

11. The computer-implemented method for a system of claim 10, wherein the one or more projectors are Spatial Light Modulator (SLM)-based projectors.

12. The computer-implemented method of claim 10, wherein the one or more projectors are Microelectromechanical System (MEMS)+Diffractive Optical Element (DOE)-based projectors.

13. The computer-implemented method of claim 12, wherein the one or more MEMS+DOE-based projectors generates the distributed laser beam to include a randomized pattern.

14. The computer-implemented method of claim 10, further comprising:

determining the area of the real-world scene based on a depth estimate confidence value.

15. The computer-implemented method of claim 10, further comprising:

determining the area of the real-world scene based on a location in the real-world scene of a virtual object of an eXtended Reality (XR) user interface of an XR application.

16. The computer-implemented method of claim 10, further comprising:

generating a 3D model of the real-world scene based on the image data of the real-world scene;

determining that the area of the real-world scene is not mapped in the 3D model based on location data of the system; and specifying the area of the real-world scene in response to determining that the area of the real-world scene is not mapped in the 3D model.

17. The computer-implemented method of claim 10, wherein the system further comprises a head-worn device.

18. The computer-implemented method of claim 10, wherein the system further comprises a smartphone.

19. A non-transitory computer-storage medium, the computer-readable storage medium including instructions that when executed by a computer, cause the computer to perform operations comprising:

capturing, using one or more cameras, image data of a real-world scene;

computing an attention mask based on the image data;

commanding one or more projectors to send a distributed laser beam into an area of the real-world scene based on the attention mask;

capturing, using the one or more cameras, three-dimensional (3D) sensing image data of the area of the real-world scene while one or more projectors are sending the distributed laser beam into the area of the real-world scene; and generating 3D sensing data for the real-world scene based on the 3D sensing image data.

20. The non-transitory computer-storage medium of claim 19, wherein the operations further comprise:

determining the area of the real-world scene based on a depth estimate confidence value.

* * * * *